United States Patent
Lu et al.

(10) Patent No.: US 12,338,129 B2
(45) Date of Patent: Jun. 24, 2025

(54) SYNTHESIS OF HECTORITE-TYPE MINERAL

(71) Applicant: IMERYS USA, INC., Roswell, GA (US)

(72) Inventors: Jie Lu, San Jose, CA (US); Benjamin Yip, Fremont, CA (US); Michael Greene, San Jose, CA (US)

(73) Assignee: Imerys USA, Inc., Roswell, GA (US)

( * ) Notice: Subject to any disclaimer, the term of this patent is extended or adjusted under 35 U.S.C. 154(b) by 881 days.

(21) Appl. No.: 17/415,513

(22) PCT Filed: Dec. 19, 2019

(86) PCT No.: PCT/US2019/067425
§ 371 (c)(1),
(2) Date: Jun. 17, 2021

(87) PCT Pub. No.: WO2020/132216
PCT Pub. Date: Jun. 25, 2020

(65) Prior Publication Data
US 2022/0041458 A1    Feb. 10, 2022

Related U.S. Application Data

(60) Provisional application No. 62/783,271, filed on Dec. 21, 2018.

(51) Int. Cl.
*C01B 33/40* (2006.01)

(52) U.S. Cl.
CPC ........ *C01B 33/405* (2013.01); *C01P 2002/22* (2013.01); *C01P 2002/50* (2013.01);
(Continued)

(58) Field of Classification Search
CPC .............. C01P 2002/22; C01P 2002/50; C01P 2002/60; C01P 2002/72; C01P 2004/20;
(Continued)

(56) References Cited

U.S. PATENT DOCUMENTS 3,586,478 A    6/1971 Neumann
3,666,407 A    5/1972 Orlemann
(Continued)

FOREIGN PATENT DOCUMENTS

EP    3395762 A1    10/2018
EP    3398908 A1    11/2018
JP    61-086414 A    5/1986

OTHER PUBLICATIONS

International Search Report and Written Opinion mailed Feb. 21, 2020, in International Application No. PCT/US2019/067425.

*Primary Examiner* — Shuangyi Abu Ali
(74) *Attorney, Agent, or Firm* — Finnegan, Henderson Farabow, Garrett & Dunner LLP

(57) ABSTRACT

A method of making a synthetic hectorite-type mineral is described, along with its resulting physical and rheological properties. The synthetic hectorite-type mineral is a 2:1 phyllosilicate essentially free of aluminum, and having a trioctahedral structure with $Mg^{2+}$ and $Li^+$ occupying octahedral sites. As a hydrogel, the synthetic hectorite-type mineral has a swell index of greater than 55 mL, and a yield point of greater than 290 Pa. The method of making uses a $MgO/MgCO_3$ buffer system, with heating for about 2 hours at temperatures of no higher than 300° C. and pressures of no higher than 600 psi.

19 Claims, 24 Drawing Sheets

(52) U.S. Cl.
CPC ...... *C01P 2002/60* (2013.01); *C01P 2002/72* (2013.01); *C01P 2004/20* (2013.01); *C01P 2004/54* (2013.01); *C01P 2004/61* (2013.01); *C01P 2006/12* (2013.01); *C01P 2006/22* (2013.01)

(58) Field of Classification Search
CPC .............. C01P 2004/54; C01P 2004/61; C01P 2006/12; C01P 2006/22; C01B 33/32; C01B 33/405
See application file for complete search history.

(56) References Cited

U.S. PATENT DOCUMENTS

| | | |
|---|---|---|
| 5,595,716 A | 1/1997 | Torii et al. |
| 2019/0135645 A1* | 5/2019 | Kim ........................ C01B 33/32 |

\* cited by examiner

Shear stress $\tau = \dfrac{F}{A}$ $\left[\dfrac{N}{m^2}\right]$

SYNTHESIS OF HECTORITE-TYPE MINERAL

CLAIM FOR PRIORITY

This application is U.S. national phase entry under 35 U.S.C. § 371 from PCT International Application No. PCT/US2019/067425, filed Dec. 19, 2019, which claims the benefit of priority of U.S. Provisional Patent Application No. 62/783,271, filed Dec. 21, 2018, from both of which this application claims priority and both of which are incorporated herein by reference.

BACKGROUND OF THE INVENTION

Technical Field

The present invention relates to a method of forming a synthetic hectorite product having a high yield point when mixed with water.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hectorite is a naturally occurring clay mineral first discovered in mines a short distance south of Hector, a town in the San Bernardino area of California. Although bentonite clays are abundant throughout the world, natural hectorite clay deposits are rather rare. Hectorite has various industrial uses. For example, hectorite is used as a thickener ingredient in some cosmetic and personal care products; in oil and gas drilling applications, hectorite clay produces a mud of favored properties as compared with that of high-grade Wyoming bentonite of much higher clay mineral content. In many other applications, hectorite may be used as an inorganic rheological modifier to change the properties of the fluid systems, such as paints, coatings, etc.

Until now, the world's only commercially developed source of natural hectorite was the long-established mine at Newberry Springs near Hector, California, operated by Elementis Specialty Products. See Elementis Specialties, A comparison of smectite clays in underarm products. https://www.elementis-specialties.com/esweb/webprodliterature.nsf/allbydocid, incorporated herein by reference in its entirety. Although Hectatone, Inc., a wholly-owned subsidiary of Western Lithium USA Corp., now Lithium Americas Corp., has claimed their lithium-rich clays from the Kings Valley deposit of Nevada as the world's second source of the special clay mineral hectorite, and processed the organoclay, branded HECTATONE, from its processing plant near Fernley, Nevada, the clay used might be just a lithium containing bentonite, rather than hectorite.

As comparing to a typical swelling clay, such as sodium bentonite, hectorite generally shows lighter colors (due to lower iron content), smaller particle sizes, and higher rheological efficacy in terms of viscosity, yield value, or yield stress. The remarkable property differences between hectorite and typical sodium bentonite are fundamentally caused by their difference in mineral chemistry, clay structure, and morphology. See Elementis Specialties; Clarke, M. T., in 'Rheological Properties of Cosmetics and Toiletries', Vol 13, ed. Laba, D., Marcel Dekker, Inc., New York, pp. 55-152, 1993, each incorporated herein by reference in their entirety.

Both bentonite and hectorite belong to the group of clays called smectite, which is a family of layered minerals that are comprised of individual platelets with a metal oxide center or octahedral layer sandwiched between two silica tetrahedral outer layers. Included in this group of clay minerals are: Hectorite, Bentonite (Montmorillonite), Saponite, Sepiolite, Beidellite, Nontronite and Sauconite. Of these, hectorite and bentonite are the most important because of their swelling properties and availability. Because of the structure these clays build after they swell in water, they have become commercially important as rheological additives, or flow control agents.

Structurally, bentonite (montmorillonite) has a dioctahedral structure. This means the two higher charged aluminum cations (i.e., $Al^{3+}$) occupy two octahedral sites between the SiO4 tetrahedral layers and offers $6^+$ charges in the structure represented by $Na_{0.33}[Al_2]Si_4O_{10}[OH]_2$; while hectorite has a trioctahedral structure, in that the octahedral layer has three octahedral sites occupied by three lower charged cations (i.e., $Mg^{2+}$ and $Li^+$), as represented by $Na_{0.33}[Mg_{2.67}Li_{0.33}]Si_4O_{10}[OH]_2$. The structural differences result in different platelet shapes and sizes for hectorite and bentonite. The hectorite platelets are much smaller and elongated compared to the more equidimensional bentonite platelets. Therefore, hectorite clay has more platelets per gram which provides greater swelling capacity and improved rheological efficiency compared to bentonite. In addition, the relatively high ion mobility of lithium in the octahedral structure can lead to more negative charges in the interlayers, thus, leading to more interlayer sodium, which also enhance the swelling. Furthermore, the hectorite platelets have more edges exposed, the charges exposed on the edges help to build a card house structure and leads to high swelling and high viscosity and better thixotropic properties.

The viscosity and yield value of hectorite in water are remarkably higher as compared to bentonite of same sample loading or at same shear stress. This is because the interactions among dispersed particles or platelets of hectorite clay are much stronger than bentonite due to the smaller particle sizes and higher surface area per gram of hectorite. The higher yield value means that hectorite is better at preventing the settling of suspended particles in formulations than bentonite.

Because of the limited resources of natural hectorite throughout the World, and the high rheological performance of hectorite clays, and the impurities in natural hectorite, many efforts have been made in the past to synthesize hectorite or similar type of inorganic rheological modifiers that can be used to replace natural hectorite. See Kloprogge, J. T., et al. (1999) Synthesis of smectite clay minerals: A critical review. Clays and Clay Minerals, Vol. 47, No. 5, 529-554, 1999; and Torii K. and Iwasaki, T. (1987) Synthesis of hectorite, Clay Science 6, 1-16, each incorporated herein by reference in their entirety. One of the efforts that eventually has led to a commercial synthetic hectorite product called Laponite®, was the work initially conducted by Barbara Susan Neumann (e.g., 1971, U.S. Pat. No. 3,586, 478 A, incorporated herein by reference in its entirety) with then Laporte Industries Limited in England. Neumann's methods used water soluble salts, such as magnesium chloride, sodium hydroxide, sodium carbonate, lithium fluoride, sodium silicate, etc., as the feeds to make a reaction mixture. The reaction mixture is then boiled under reflux in ambient conditions for 20 hours. After the reaction, the precipitated reaction product is filtered, washed, and dried at 130° C.

before milled to final product. See Barbara Susan Neumann (1971), Synthetic hectorite-type clay minerals: U.S. Pat. No. 3,586,478 A; and Taylor J. & Neumann B. S. 1968, The nature of synthetic swelling clays and their use in emulsion paint. J. Oil Col. Chem. Assoc. 51, 232-253, each incorporated herein by reference in their entirety. Laponite® series of products, because of their relatively high transparency and good rheological properties, have since become the major synthetic hectorite clay product in the market place. However, due to the uses of soluble chemicals as the reaction feeds and long reaction time (>24 hours), the Laponite® incurs with a relatively high cost, and its applications are thus limited.

Separately, Torii et al. (1986) reported an alternative, but rather similar hydrothermal process for the synthesis of hectorite-like smectite. See Torii K. et al., incorporated herein by reference in its entirety. Their process differs from that of Laporte Industries Ltd. in that homogeneous slurries of desirable hectorite compositions are prepared as the starting materials. According to Torii, the Si—Mg solution was prepared from soluble salts and have Mg/Si atomic ratio of (5.0-6.5)/8 by dissolving magnesium chloride in an acidic silicate solution prepared from sodium silicate and nitric acid; aluminum chloride was added to affect the particle sizes if needed. The Si—Mg precipitate was washed and filtered to remove secondary products before adding NaOH and LiOH. The synthesis reactions were performed hydrothermally in a static autoclave at 125° C.-300° C. under autogenous water vapor pressure for 1-24 h. After the reaction, the products were dried at 80° C. and powdered.

Although the synthesis that uses pure chemicals as the feed materials give whiter or lighter color products, the costs of using pure chemicals are usually high. Besides, longer reaction time is required to generate the proper sizes of clay platelets. In addition, the precipitation and gelling from solution of soluble chemicals usually present more difficulties in separation. The products, due to their fine particles, may have limited viscosity especially under high shear stress.

Many researchers attempted to use natural occurring minerals as the feeds for the synthesis of hectorite. For examples, Orlemann (1972) used the flux-calcination feed of talc and $Li_2CO_3$ heated at 1400° F.-1800° F., and mixed with an aqueous solution of sodium silicate and $Na_2CO_3$ as the reaction feed, which was subsequently hydrothermally treated at 185-210° C. and 150-250 psi for 8-16 hours. See Orlemann J. K. (1972) Process for producing synthetic hectorite-type clays, U.S. Pat. No. 3,666,407, incorporated herein by reference in its entirety. Apparently, the high temperature calcination process used for the preparation of the feeds will increase the costs and processing time.

Similar to the method used by Orlemann in U.S. Pat. No. 3,666,407, Barbara Susan Neumann et al (1976) also used talc as starting material, but instead of using $Li_2CO_3$, they used $Na_2CO_3$ to convert the talc into thermally degraded feed called mesotalc for further hectorite type material synthesis under hydrothermal conditions for 1-20 hours. See Barbara Susan Neumann et al (1976), Synthesis of hydrous magnesium silicates. U.S. Pat. No. 3,954,943, incorporated herein by reference in its entirety.

Wright and Rupert (1977) disclosed a method of synthesizing smectite-type of clays and gellants with trioctohedral structures similar to hectorite under hydrothermal conditions with a reaction feed made of hydrofluoric acid, magnesia and NaOH and LiOH base, mixed with a silica sol. The typical reaction conditions are 85° C. to 250° C. under autogenous pressures for 4 to 250 hours.

Due to various reasons, mostly related to high costs and product performance disadvantages, most synthesis methods did not lead to commercial products of synthetic hectorite, except for Laponite®.

Laponite® is a synthetic crystalline layered silicate colloid material with crystal structure and composition closely resembling the natural hectorite. It is currently manufactured by Rockwood Additives Ltd (formerly Laporte Industries. Ltd.), Cheshire UK, and Southern Clay Products, Inc., Gonzales, Texas. The sample used in the present study was Laponite® RD, which is a fast-dispersing gel-grade material having a wide range of waterborne applications, including household and industrial surface coatings, cleansers, personal care and cosmetic products including shampoos and sunscreens, ceramic glazes agrochemical, oilfield and horticultural products, etc. Laponite® has the general empirical formula of $Na_{0.7}Si_8Mg_{5.5}Li_{0.3}O_{20}(OH)_4$, in which some magnesium ions are substituted by lithium ions (monovalent) and some positions are empty. This leads to a negative charge of 0.7 per unit cell, which becomes neutralized during manufacture as sodium ions are adsorbed onto the surfaces of the crystals. The chemical analysis of Laponite® RD gives typical chemical compositions of: $SiO_2$, 65.82%; MgO, 30.15%; $Na_2O$, 3.20%; and $Li_2O$, 0.83%. Laponite® RD has a surface area of 370 $m^2/g$ and a cation exchange capacity (CEC) of 85 meq/100 g. The particles of Laponite® RD are in nanometer sizes, with average particle size of 25 nm. The pH for a 2% Laponite® RD suspension in pure water is 9.8.

As pointed out earlier, although Laponite® is made with high purity chemicals and with good rheological properties, the reaction feeds prepared from soluble chemicals, the relative long reaction time, the process problems related to the product separation and dewatering, and dispersion, etc., could lead to increased costs.

In view of the foregoing, we report our hydrothermal synthesis methods for the synthesis of the hectorite-type clays or rheological modifiers that have apparently higher swelling and better viscosity properties than commercial Laponite®. In these reactions, we use readily available synthetic or natural powdered materials as the major reaction feeds, instead of using soluble salts; especially for the silica and magnesium sources, and a self-buffered $Mg(OH)_2$—$MgCO_3$ system along with alkali fluoride and lithium compounds. The reaction time is typically 2 hours. The product characterization and the key rheological performance properties, as compared to commercial Laponite® RD, are presented herewith.

BRIEF SUMMARY OF THE INVENTION

According to a first aspect, the present disclosure relates to a method of making a synthetic hectorite-type mineral. The method involves the steps of mixing sodium silicate, a silica source, lithium hydroxide, sodium fluoride, and water to form a first mixture. Then a magnesium source and an acid are mixed with the first mixture to form a second mixture. The magnesium source comprises magnesium carbonate and/or magnesium oxide. Next, the second mixture is heated to form an intermediary product. The intermediary product is dried and milled to form the synthetic hectorite-type mineral.

In one embodiment, the silica source comprises silica gel having a BET surface area in a range of 400-550 $m^2/g$.

In one embodiment, the silica source comprises a diatomaceous earth product.

In one embodiment, the silica source comprises an opaline silica product.

In one embodiment, the silica source consists of silica gel, and a mass ratio of the sodium silicate to the silica gel is in a range of 1.0:1.2-1.2:1.0.

In one embodiment, the second mixture is heated at a temperature of 200-500° C. and a pressure of 100-800 psi for 0.5-12 hours to form the intermediary product.

In one embodiment, a mass ratio of magnesium carbonate to magnesium oxide is in a range of 1.0:1.2-1.2:1.0.

In one embodiment, the second mixture is agitated during the heating.

In one embodiment, the synthetic hectorite-type mineral is a 2:1 layered phyllosilicate having a tetrahedral double layer sandwiching an octahedral layer, the octahedral layer having a plurality of octahedral sites occupied by $Mg^{2+}$ or $Li^+$, and the hectorite-type mineral has a formula of $Na_a(Mg_bLi_c)(Si_4O_{10})(F_d(OH)_e)$. Here, a is in a range of 0.3 to 0.4; b and c range from 0 to 3 with b+c=3, and d and e range from 0 to 2 with d+e=2.

In a further embodiment, a ratio of b to c ranges from 7.0:1 to 9.0:1.

In a further embodiment, a ratio of b to c ranges from 7.5:1 to 8.5:1.

In a further embodiment, at least 90% of the octahedral sites are occupied by $Mg^{2+}$ or $Li^+$.

In a further embodiment, d is in a range of 0.3 to 0.7.

In a further embodiment, the synthetic hectorite-type mineral has a $D_{50}$ in a range of 8-30 μm.

In a further embodiment, the synthetic hectorite-type mineral has a mean crystalline size in a range of 18-38 nm.

In a further embodiment, the synthetic hectorite-type mineral is in the form of platelets having an aspect ratio in a range of 1.2:1 to 3.0:1.

In a further embodiment, the synthetic hectorite-type mineral has a swell index of at least 55 mL, the swell index according to ASTM D5890.

In a further embodiment, a suspension comprising 5 wt % of the synthetic hectorite-type mineral in water, relative to a total weight of the suspension, has a yield point of at least 290 Pa.

In a further embodiment, a suspension comprising 5 wt % of the synthetic hectorite-type mineral in water, relative to a total weight of the suspension, has a yield stress in a range of 350-450 Pa at a temperature of 50-85° C.

In a further embodiment, a suspension comprising 2 wt % of the synthetic hectorite-type mineral in water, relative to a total weight of the water, has a cation exchange capacity in a range of 95-130 meq per 100 g synthetic hectorite-type mineral.

According to a second aspect, the present disclosure relates to a synthetic hectorite-type mineral made by the method of the first aspect.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
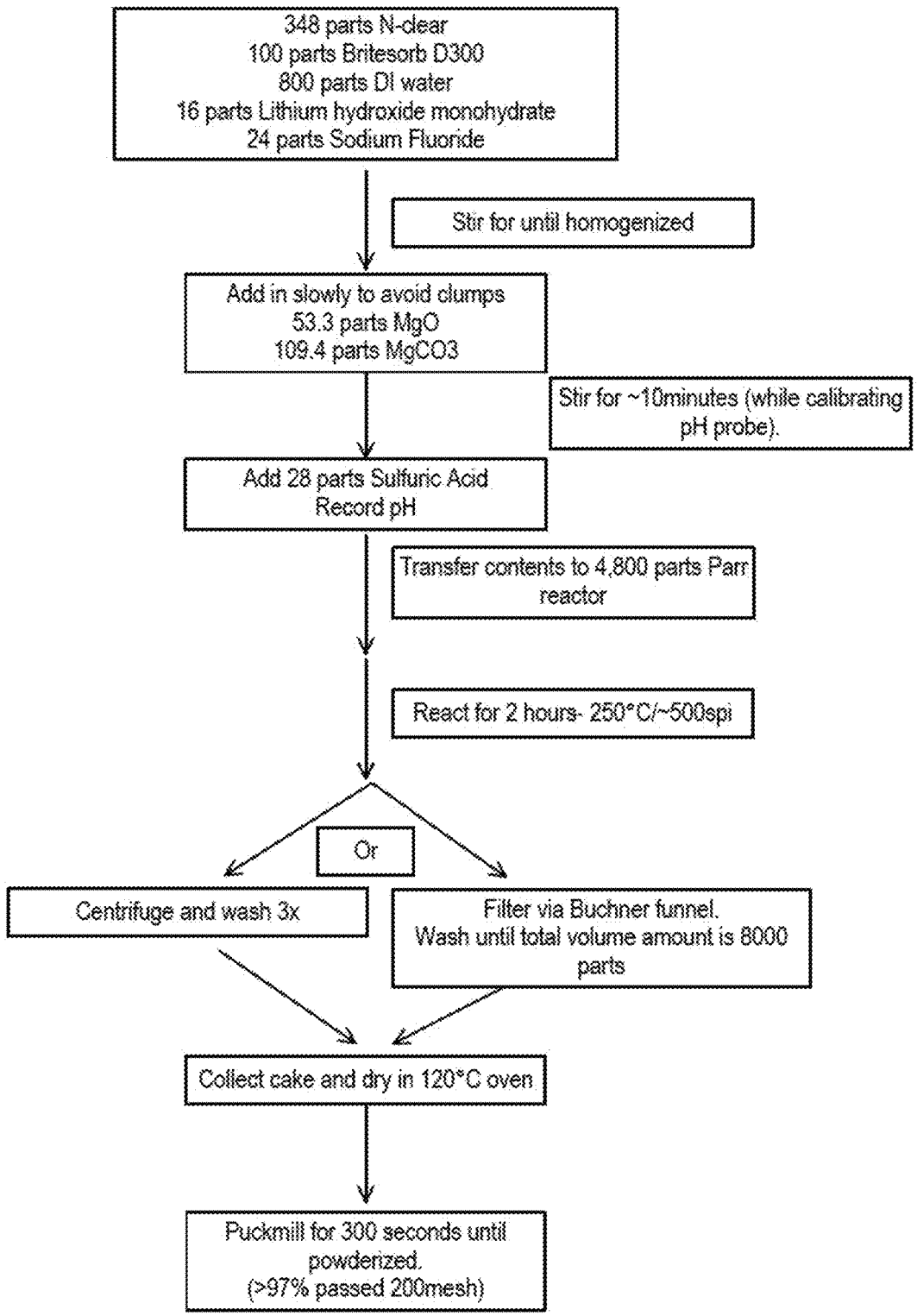
FIG. 1 is a typical synthesis flow chart illustrating the steps in the synthesis of the hectorite in this study.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" or "mineral" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted. As examples, "LiOH" includes anhydrous LiOH, LiOH·H$_2$O, and any other hydrated forms or mixtures; "MgO" includes its hydrated form, i.e., Mg(OH)$_2$, because in hydrothermal reactions, oxide anhydrides are easily turned into hydroxides upon mixing with water.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}$C and $^{14}$C. Isotopes of nitrogen include $^{14}$N and $^{15}$N. Isotopes of oxygen include $^{16}$O, $^{17}$O, and $^{18}$O. Isotopes of silicon include $^{28}$Si, $^{29}$Si, $^{30}$Si, and $^{32}$Si. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method of making a synthetic hectorite-type mineral.

The synthetic hectorite-type mineral may be a type of phyllosilicate, or sheet silicate, which has parallel sheets of silicate tetrahedra where each silicate sheet comprises Si$_4$O$_{10}$ or has a 2:5 molar ratio of Si:O. Further, the synthetic hectorite-type mineral may be a type of clay mineral.

Clay minerals are characterized by two-dimensional sheets of corner sharing SiO$_4$ tetrahedra and/or AlO$_4$ octahedra. The sheet units have the chemical composition (Al, Si)$_3$O$_4$. Each silica tetrahedron shares 3 of its vertex oxygen atoms with other tetrahedra forming a hexagonal array in two-dimensions. The fourth vertex is not shared with another tetrahedron and all of the tetrahedra "point" in the same direction; i.e. all of the unshared vertices are on the same side of the sheet.

In clay minerals, the tetrahedral sheets are bonded to octahedral sheets formed from small cations, such as aluminum, magnesium, and lithium, and are coordinated by six oxygen atoms. Each unshared vertex from the tetrahedral sheet also forms part of one side of the octahedral sheet, but an additional oxygen atom is located above the gap in the tetrahedral sheet at the center of the six tetrahedra. This oxygen atom is bonded to a hydrogen atom forming an OH group in the structure. Clays may be categorized depending on the way that tetrahedral and octahedral sheets are packaged into layers. If there is only one tetrahedral and one octahedral group in each layer the clay is known as a 1:1 clay. The alternative, known as a 2:1 clay, has two tetrahedral sheets with the unshared vertex of each sheet pointing towards each other and forming each side of the octahedral sheet. In other words, a tetrahedral double layer sandwiches an octahedral layer.

Bonding between the tetrahedral and octahedral sheets may require that the tetrahedral sheet becomes corrugated or twisted, causing ditrigonal distortion to the hexagonal array, and the octahedral sheet may be flattened. This minimizes the overall bond-valence distortions of the crystallite. Depending on the composition of the tetrahedral and octahedral sheets, the layer will have no charge, or will have a net negative charge. If the layers are charged this charge is balanced by interlayer cations such as Na$^+$ or K$^+$. In each case, the interlayer may contain water. The crystal structure is formed from a stack of layers interspaced with the interlayers.

In one embodiment, the synthetic hectorite-type mineral may be a clay mineral similar or identical to a clay mineral of the following types: kaolin, smectite, illite, chlorite, sepiolite, attapulgite, or some other type. Kaolins include the minerals kaolinite, dickite, halloysite, and nacrite. Smectites include dioctahedral smectites such as montmorillonite, nontronite, bentonite, and beidellite. In dioctahedral smectites, an average of 2 of every 3 octahedral sites are occupied by a cation. Trioctahedral smectites include saponite and hectorite. In trioctahedral smectites, approximately all three of every three octahedral sites are occupied by a cation. Illites include clay-micas and illite. Chlorites include baileychlore, chamosite, clinochlore, cookeite, donbassite, gonyerite, nimite, odinite, orthochamosite, pennantite, ripidolite, and sudoite. Other 2:1 clay types exist such as sepiolite or attapulgite. In one embodiment, the synthetic hectorite-type mineral may be a smectite, and may be a dioctahedral or a trioctahedral smectite, preferably a trioctahedral smectite. In one embodiment, the synthetic hectorite-type mineral may be considered hectorite, or a modified hectorite (such as a fluoride-doped hectorite). In one embodiment, the synthetic hectorite-type mineral may have a layer spacing of 0.8-1.2 nm, preferably 0.9-1.1 nm. In one embodiment, the synthetic hectorite-type mineral may have an interlayer spacing (space between adjacent pairs of double layers of tetrahedral sheets) of 0.3-0.7 nm, preferably 0.4-0.6 nm. In one embodiment, the synthetic hectorite-type mineral may have a layer charge per unit cell in a range of 0.3-1.4, preferably 0.33-1.2, more preferably 0.4-0.8. In one embodiment, the synthetic hectorite-type mineral may be relatively soft, with a Mohs scale hardness of 1-2, and may also have a monoclinic crystal system.

In one embodiment, the synthetic hectorite-type mineral being a "hectorite-type" mineral means that the synthetic hectorite-type mineral is a trioctahedral smectite with $Mg^{2+}$ and $Li^+$ occupying the octahedral sites at molar ratio similar to natural hectorite. In another embodiment, synthetic hectorite-type mineral being a "hectorite-type" mineral means that the synthetic hectorite-type mineral shares at least four, preferably at least five, more preferably at least six major X-ray diffraction peaks with hectorite, or with a known synthetic hectorite, such as Laponite®. For example, this is shown in FIG. 2, where a synthetic hectorite-type mineral shares six of the six major XRD pattern peaks with Laponite®. Preferably the synthetic hectorite-type mineral has other bulk properties similar to natural hectorite, such as density, where the synthetic hectorite-type mineral may have a density of 2.0-3.0 $g/cm^3$, preferably 2.2-2.8 $g/cm^3$, more preferably 2.3-2.7 $g/cm^3$.

In one embodiment, the synthetic hectorite-type mineral being "synthetic" means that the synthetic hectorite-type mineral is formed by people, rather than by natural processes, and that the synthetic hectorite-type mineral is formed from reagents that are not clay minerals. However, in an alternative embodiment, a hectorite-type mineral may be formed from other clay minerals, for instance, with ion exchange of a 2:1 phyllosilicate. As defined here, a natural hectorite means that the hectorite is extracted from the earth. A natural hectorite may be treated with physical processing such as milling or drying, and still be considered a natural hectorite.

In one embodiment, the synthetic hectorite-type mineral may be considered an expansive clay, or a water swellable clay. An expansive clay is a clay mineral prone to large volume changes (swelling and shrinking) directly related to changes in water content. In one embodiment, the synthetic hectorite-type mineral has a swell index of at least 40 mL, at least 45 mL, at least 50 mL, at least 55 mL, or at least 60 mL. Here, the swell index is measured according to ASTM D5890, which procedure is summarized in Example 2 below. In one embodiment, the synthetic hectorite-type mineral may have a swell index of 35-80 mL, 40-70 mL, or 50-65 mL.

Figure 9:
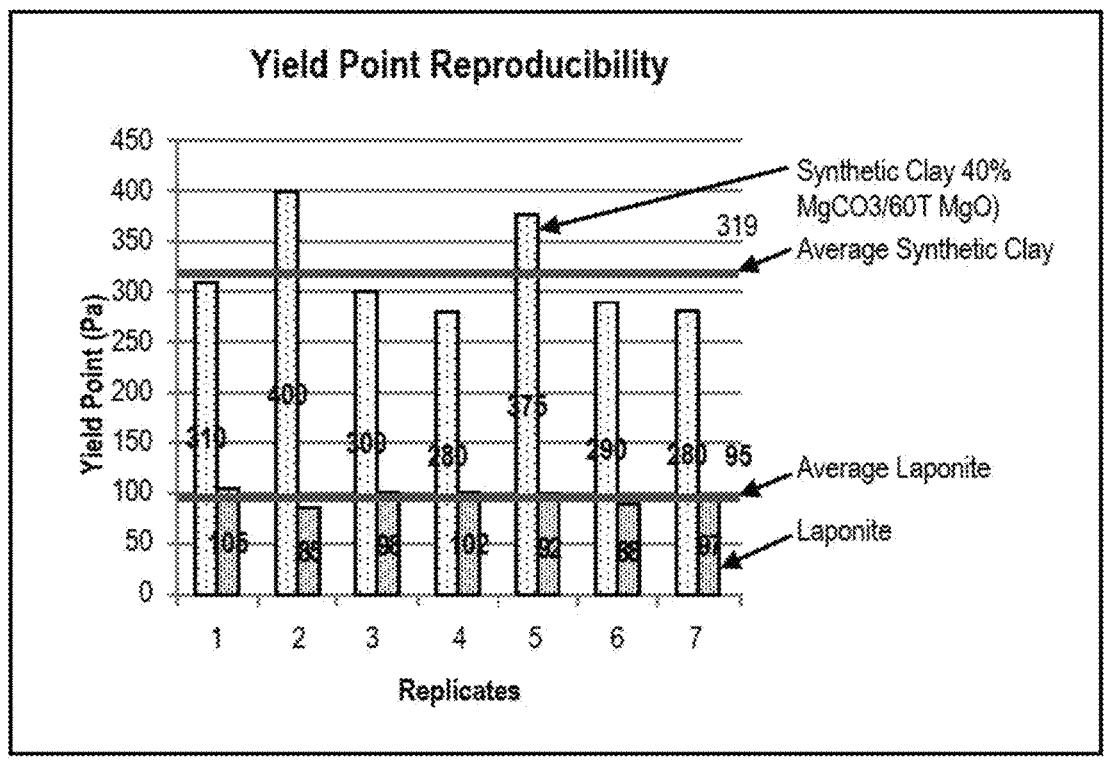
FIG. 9 is a graph illustrating the yield points of the synthetic clays made on different dates, as compared to the bench mark of Laponite®.

Being an expansive clay of small crystalline size, the synthetic hectorite-type mineral may have other notable rheology properties such as yield point, yield stress, yield stress aging, and cation exchange capacity when mixed with water to form a slurry or a suspension. The synthetic hectorite-type mineral may have a high elasticity as a hydrogel, and may also be thixotropic, meaning that its viscosity quickly drops when exposed to an increased level of sheer. This drop in viscosity marks the yield point, and such properties may be observed in a suspension of 1-30 wt %, preferably 2-15 wt %, more preferably 3-7 wt %, or about 5 wt %, or exactly 5 wt % of the synthetic hectorite-type mineral in water, relative to a total weight of the suspension. In some embodiments, the suspension may be aged for 12-36 h, preferably 16-24 hours before a rheological measurement. In one embodiment, a suspension of the synthetic hectorite-type mineral in water has a yield point of at least 100 Pa, at least 150 Pa, at least 200, at least 250 Pa, at least 290 Pa, at least 300 Pa, or at least 350 Pa. In one embodiment, the synthetic hectorite-type mineral may have a yield point of 200-400 Pa, or 250-380 Pa. Preferably, the yield point of the synthetic hectorite-type mineral is greater than that of other expansive clays and synthetic clays, including Laponite®, having an equivalent weight percentage in water. For instance, a slurry comprising 5 wt % of the synthetic hectorite-type mineral in water, relative to a total weight of the slurry, may have a yield point greater than a slurry of 5 wt % Laponite® (in water, relative to a total weight of the slurry) by a factor of at least 2, preferably at least 2.5, more preferably at least 3.0. As an example, the average synthetic clay yield point of FIG. 9 is 319 Pa, and the average yield point of Laponite® is 95 Pa. Here, the synthetic clay (synthetic hectorite-type mineral) has an average yield point greater by a factor of 319/95=3.4.

Figure 20:
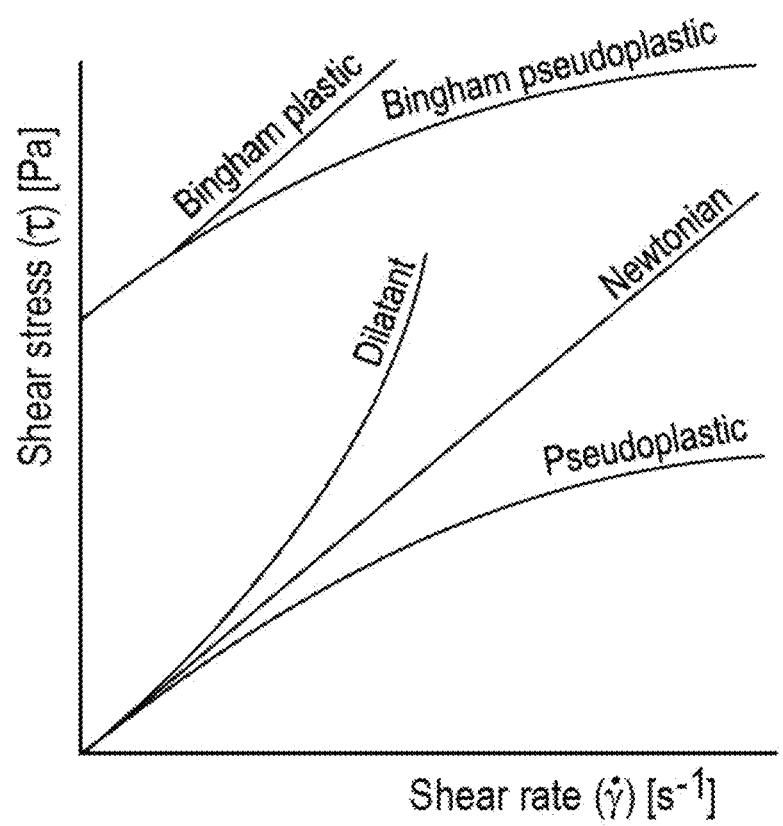
FIG. 20 illustrates the classification of fluids with shear stress as a function of shear rate.

In related embodiments, a suspension of a synthetic hectorite-type mineral may be classified as a shear-thinning fluid, due to the viscosity decreasing when the shear stress is increased. In a comparison of shear stress relative to shear rate, a suspension of a synthetic hectorite-type mineral may show properties similar to Bingham plastic fluids or Bingham pseudoplastic fluids, as shown in FIG. 20.

Figure 15:
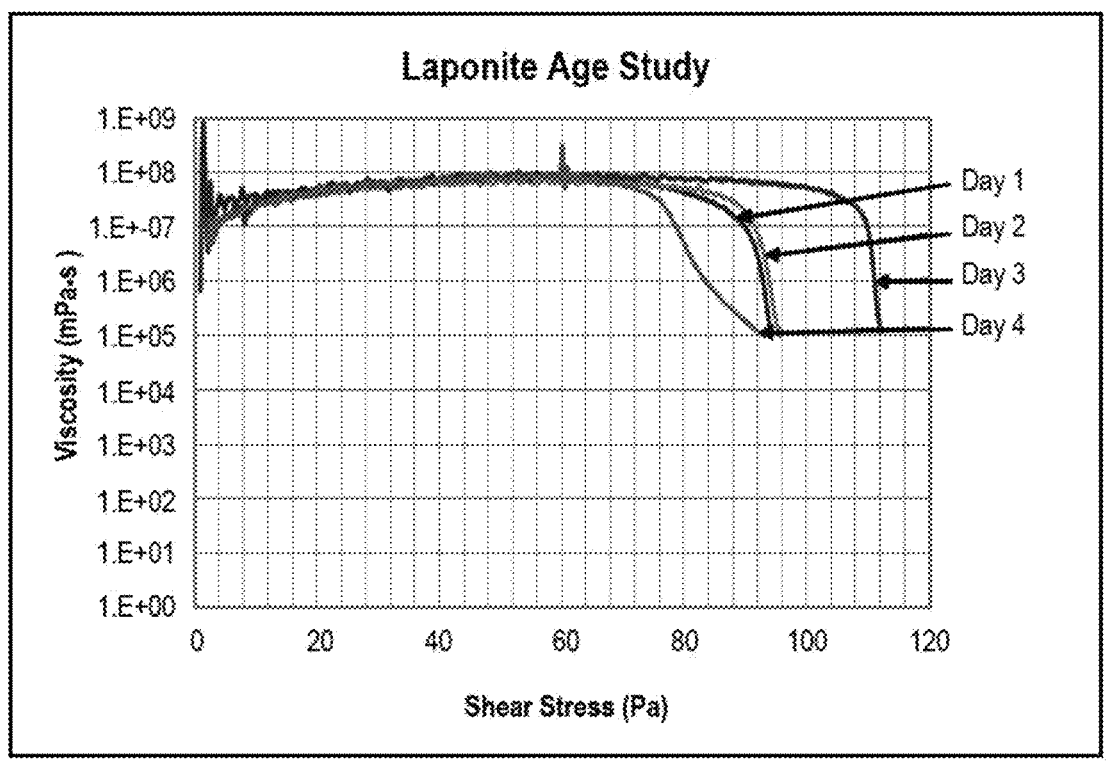
FIG. 15 is a graph illustrating the aging effects of Laponite® RD.
Figure 16:
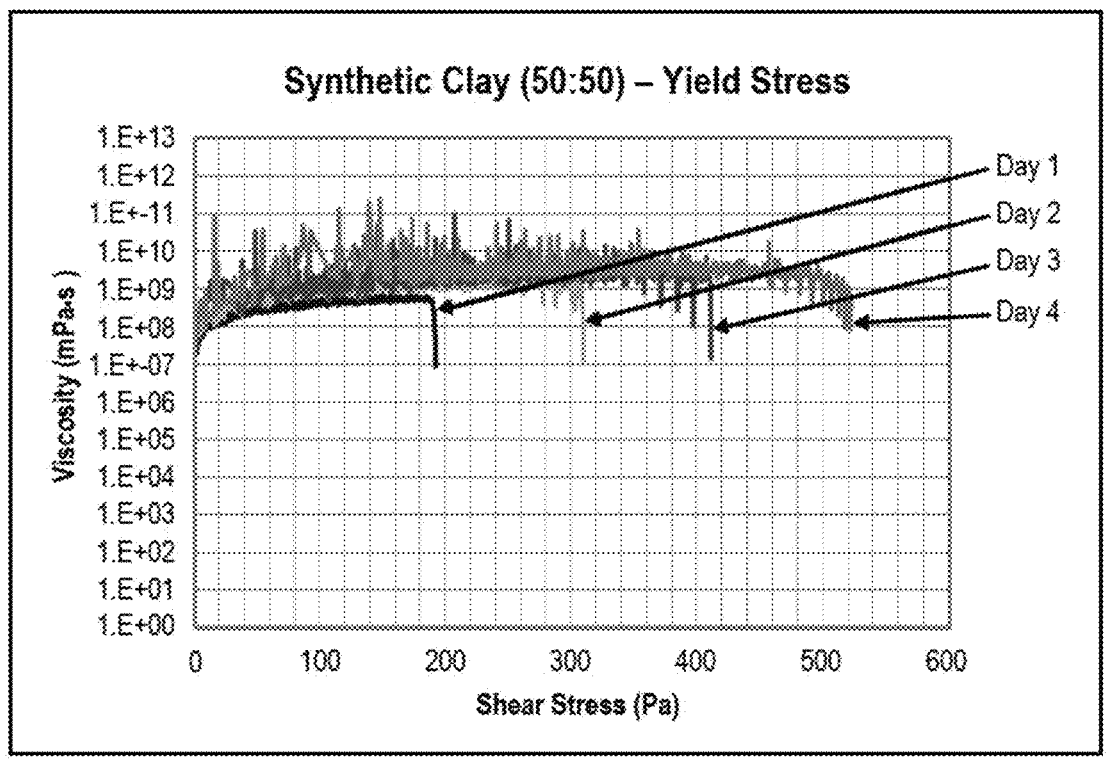
FIG. 16 is a graph illustrating yield stress of the synthetic clay pastes when aged to different time.
Figure 17:
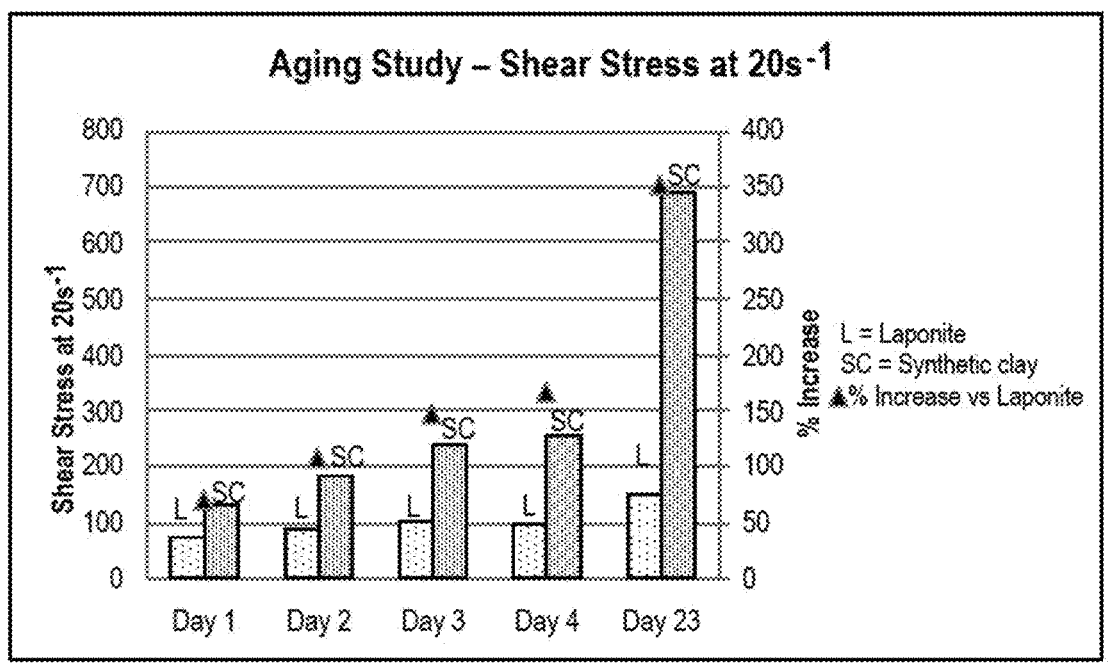
FIG. 17 is a graph illustrating the comparison of shear stress increase with aging at a shear rate of 20 $s^{-1}$ for Laponite® and the synthetic clay.

Generally, yield points of swellable clay slurries may increase with aging. In one embodiment, the yield point of a slurry comprising 5 wt % of the synthetic hectorite-type mineral in water, relative to a total weight of the slurry, increases by a factor of at least 2, preferably at least 2.5, more preferably at least 2.7 over an aging period of at least 3 days, preferably at least 4 days. An example of this increase is shown in FIG. 16. In one embodiment, this increase is significantly greater than the relative yield point increase experienced by a slurry of the same weight percent of Laponite®. For instance, over a period of 3-4 days, the yield point of Laponite® may only increase by a factor of 1.2-1.6 relative to its initial yield point, as shown in FIG. 15. The yield point of a synthetic hectorite-type mineral slurry may continue to increase with further aging beyond 4 days as compared to a Laponite® slurry, as shown in FIG. 17.

In one embodiment, a suspension of the synthetic hectorite-type mineral in water has a yield stress in a range of 300-500 Pa, 325-475 Pa, 350-450 Pa, or 370-425 Pa at a temperature of 25-100° C., 35-95° C., 40-95° C., 50-85° C., 55-82° C., or 60-80° C. As mentioned previously, the suspension comprises the synthetic hectorite-type mineral mixed with water where the synthetic hectorite-type mineral is present at a weight percentage of 1-30 wt %, preferably 2-15 wt %, more preferably 3-7 wt %, or about 5 wt % relative to the total weight of the suspension. In one embodiment, the suspension comprises 5 wt % of the synthetic hectorite-type mineral in water, relative to the total weight of the suspension.

Figure 11:
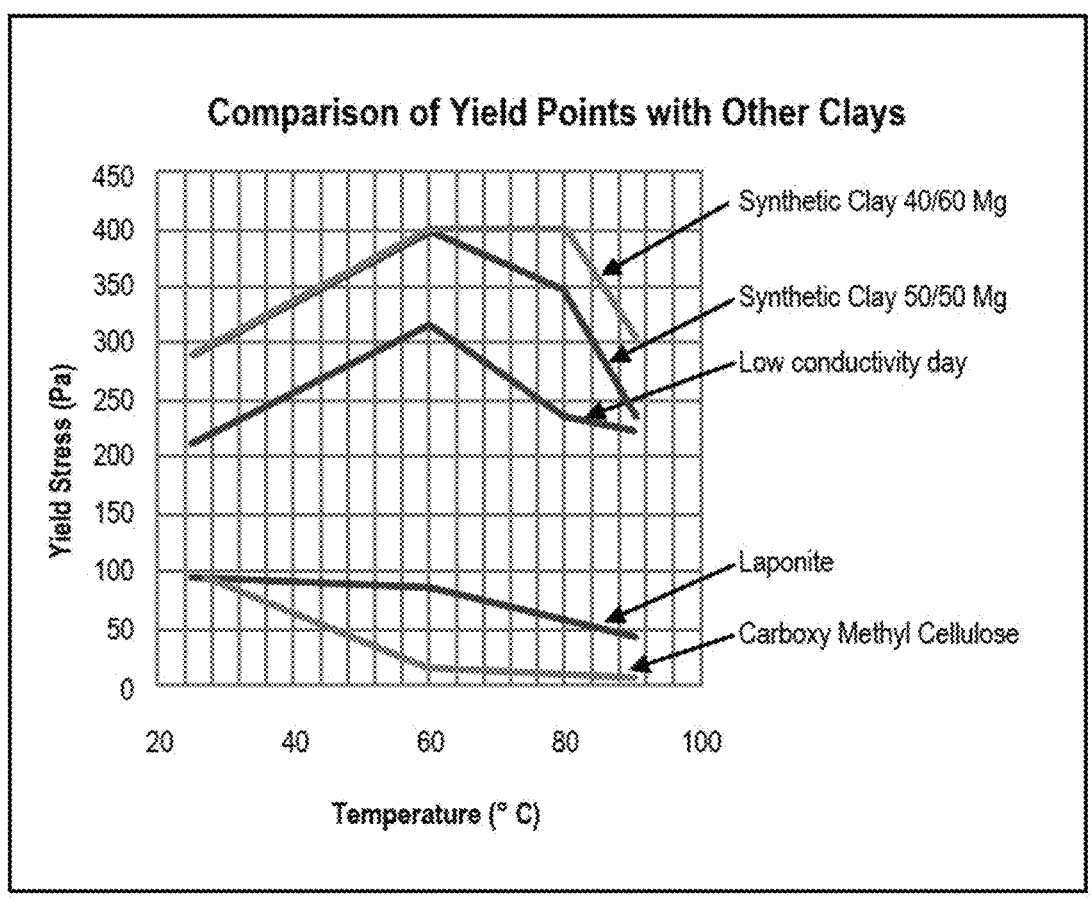
FIG. 11 is a graph illustrating the yield stress of the synthetic clays at elevated temperatures.

In one embodiment, the yield stress of a synthetic hectorite-type mineral suspension is greater than a suspension of Laponite®, for instance, when both comprise the same concentration of mineral and are compared at the same temperatures. For instance, over a temperature range of 25-90° C., the yield stress of a synthetic hectorite-type mineral suspension may be greater than a suspension of Laponite® by a factor of at least 2, preferably at least 2.5, more preferably at least 3. In some temperature ranges, such as 60-80° C., the yield stress of a synthetic hectorite-type mineral suspension may be greater than that of a suspension of Laponite® by a factor of at least 4, at least 5, at least 6, or at least 7. FIG. 11 shows these differences in yield stress between synthetic hectorite-type mineral suspensions and Laponite® suspensions at different temperatures.

Figure 14:
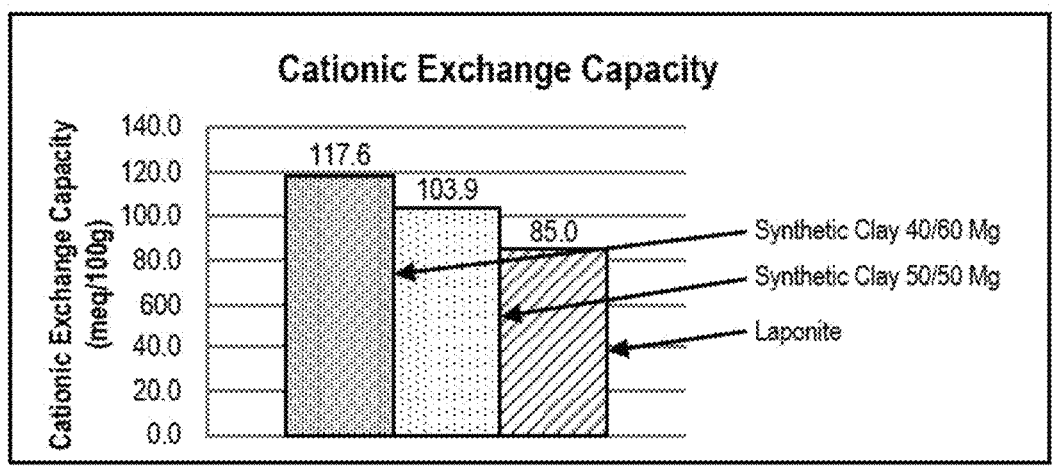
FIG. 14 is a graph illustrating the cation exchange capacity of Synthetic Clay vs Laponite®.

The synthetic hectorite-type mineral may have a high cation exchange capacity when compared to other natural and synthetic clay minerals. Cation exchange capacity is defined as the amount of positive charge that can be exchanged per mass of clay mineral. Cation exchange capacity may be represented by the units meq/100 g, which stand for milliequivalents per 100 g clay mineral, and may also be represented by the fundamentally equivalent units cmolc/kg, which show that the value can also be understood as moles of electric charge than can be exchanged per kg. In one embodiment, a suspension of the synthetic hectorite-type mineral in water has a cation exchange capacity in a range of 50-150 meq/100 g, 90-145 meq/100 g, 95-130 meq/100 g, 100-125 meq/100 g, or 105-120 meq/100 g. The suspension comprises the synthetic hectorite-type mineral mixed with water where the synthetic hectorite-type mineral is present at a weight percentage of 0.1-20 wt %, preferably 0.5-10 wt %, more preferably 1-5 wt %, or about 2 wt % relative to the total weight of the water. In one embodiment, the suspension comprises 2 wt % of the synthetic hectorite-type mineral in water, relative to the total weight of the water. In one embodiment, the cation exchange capacity of a suspension of the synthetic hectorite-type mineral may be greater by a factor of at least 1.1, preferably at least 1.2, more preferably at least 1.3 as compared to a suspension of Laponite® made with the same concentration. An example comparison between cation exchange capacities of Laponite® and synthetic hectorite-type mineral samples are shown in FIG. 14.

In one embodiment, the synthetic hectorite-type mineral is a 2:1 layered phyllosilicate having a tetrahedral double layer sandwiching an octahedral layer, the octahedral layer having a plurality of octahedral sites occupied by $Mg^{2+}$ or $Li^+$. In a further embodiment, at least 80%, preferably at least 90%, more preferably at least 95% of the octahedral sites are occupied by $Mg^{2+}$ or $Li^+$, relative to the total number of octahedral sites in the octahedral layer. In one embodiment, essentially every octahedral site is occupied by $Mg^{2+}$ or $Li^+$.

In one embodiment, the hectorite-type mineral has the formula of $Na_a(Mg_bLi_c)(Si_4O_{10})(F_d(OH)_e)$.

In one embodiment, a is in a range of 0.3 to 0.4; 0.31 to 0.36, 0.32 to 0.35, 0.25 to 0.45, 0.28 to 0.42, about 0.30, about 0.40, or about 0.33.

In one embodiment, the sum of b and c ranges from 1.8 to 4.2, preferably 2.0 to 4.0, preferably 2.5 to 3.5, about 3.0, or exactly 3. Preferably the sum of b and c is 3. In one embodiment, b and c each independently range from 0 to 4.2, preferably 0 to 3, more preferably 0.3 to 2.8.

In one embodiment, b is about 2.5, about 2.6, about 2.67, or about 2.7, and c is about 0.3, about 0.33, about 0.4, or about 0.5.

In one embodiment, the ratio of b to c ranges from 6.5:1 to 9.5:1, from 6.8:1 to 9.2:1, from 7.0:1 to 9.0:1, from 7.2:1 to 8.7:1, from 7.5:1 to 8.5:1, or from 7.7:1 to 8.2:1. In one embodiment, the ratio of b to c is about 8.0:1 or equal to 8:1.

In one embodiment, the sum of d and e ranges from 1 to 3, preferably 1.5 to 2.5. In one embodiment, the sum of d and e is about 2.0 or exactly 2. In one embodiment, d and e each independently range from 0 to 3, 0 to 2, preferably 0.1 to 1.9, 0.2 to 1.8, 0.3 to 1.7, 0.4 to 1.6, more preferably 0.5 to 1.5. In one embodiment, d is 0.4-0.6, or about 0.5. In one embodiment, e is 1.4-1.6, or about 1.5. In one embodiment, d is 0.5, and e is 1.5.

In a further embodiment, d is in a range of 0.1 to 0.8, 0.2 to 0.6, 0.3 to 0.7, 0.4 to 0.6, or about 0.5. In one embodiment, d is 0.5.

In a preferred embodiment, the synthetic hectorite-type mineral has the formula $Na_{0.4}(Mg_{2.67}Li_{0.33})(Si_4O_{10})(F_{0.5}(OH)_{1.5})$. However, in some embodiments, the synthetic hectorite-type mineral may comprise less or no fluoride, for instance less than 1.0 wt % F, less than 0.5 wt % F, less than 0.1 wt % F, or essentially no F (0 wt %), relative to a total weight of the synthetic hectorite-type mineral.

In other embodiments, the synthetic hectorite-type mineral comprises carbonate. For instance, carbonate may replace a portion of hydroxide in the empirical formula of the synthetic hectorite-type mineral, where a molar ratio between carbonate and hydroxide may be in a range of 1:50-50:1, preferably 1:20-20:1, more preferably 1:10-10:1.

Figure 3:
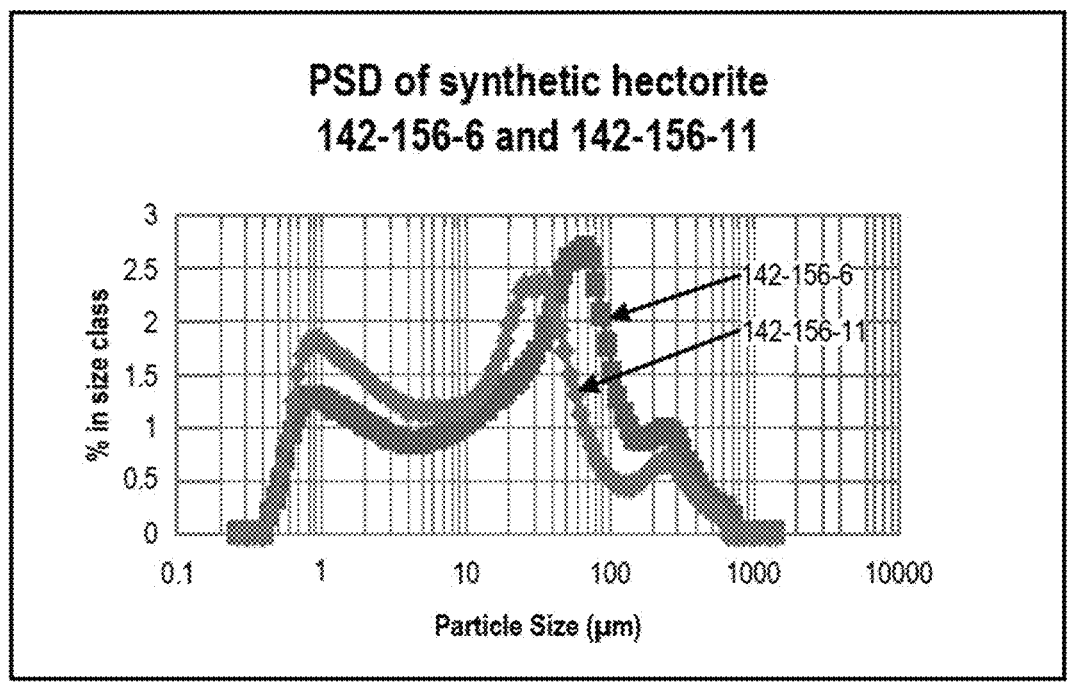
FIG. 3 is a graph illustrating the particle size distribution of synthetic hectorite.

In one embodiment, the synthetic hectorite-type mineral has a D50 in a range of 8-30 μm, preferably 10-28 μm, 10-15 μm, or 24-27 μm. In one embodiment, the particle size distribution may be multimodal, as shown in FIG. 3, and in another embodiment, the particle size and particle size distribution may be affected by milling or other physical processing conditions. Preferably the particle size and particle size distribution are measured on a dry powder of the synthetic hectorite-type mineral, due to its high swelling properties in water.

In one embodiment, the synthetic hectorite-type mineral has a mean crystalline size in a range of 15-45 nm, 18-38 nm, 20-32 nm, or 22-28 nm. Here, the mean crystalline size may be determined by powder XRD and the Scherrer equation, as discussed below in Example 3. In one embodiment, the mean crystalline size may be similar or equivalent to a particle diameter or the length of the particle.

In a further embodiment, the synthetic hectorite-type mineral is in the form of platelets having an aspect ratio in a range of 1.1:1 to 3.5:1, 1.2:1 to 3.0:1, 1.2:1 to 2.0:1, or 1.2:1 to 1.4:1. As defined here, the aspect ratio is the ratio of the length of the platelet to its width. The platelets may have an average thickness of 0.7-1.6, preferably 0.8-1.5 nm, more preferably 0.9-1.2 nm.

In one embodiment, the method of making the synthetic hectorite-type mineral involves the steps of mixing sodium silicate, a silica source, lithium hydroxide, sodium fluoride, and water to form a first mixture. Then a magnesium source and an acid are mixed with the first mixture to form a second mixture having a pH in a range of 9.5-10.5. Next, the mixture is heated at a temperature of 200-300° C. and a pressure of 300-600 psi for 1-4 hours to form an intermediary product. The intermediary product is dried and milled to form the synthetic hectorite-type mineral.

According to another aspect of the invention, the present disclosure relates to a synthetic hectorite-type mineral made by the method disclosed above, as well as variations on the method described below.

In one embodiment, the sodium silicate may be in a solution such as N® CLEAR sodium silicate solution from PQ Corporation, Malvern, PA. For instance, the sodium silicate may be dissolved in water at a weight percent concentration of 30-45 wt %, preferably 35-40 wt %. In other embodiments, sodium silicate as a powder may instead be used. In an alternative embodiment, some other silicate may be used, such as lithium silicate.

In one embodiment, the silica source may be a silica gel, silica fume, a diatomaceous earth product, an opaline silica product, talc, perlite, and/or some other silica source. The silica gel may have a BET surface area in a range of 400-550 $m^2/g$, preferably 420-530 $m^2/g$, more preferably 450-510 $m^2/g$, or about 475 $m^2/g$. However, in other embodiments, the silica gel may have a BET surface area of less than 400 $m^2/g$ or greater than 550 $m^2/g$. The silica gel may have a median particle size of 8-15 μm, preferably 10-14 μm. The silica gel may be identical or similar to the silica gel product BRITESORB® D300 from PQ Corporation, Malvern, PA. In another embodiment, the silica gel may be similar to a SYLOID® silica excipient, from W. R. Grace & Co, Columbia, MD.

The diatomaceous earth product may be naturally occurring diatomaceous earth, or a diatomaceous earth that is subjected to calcining or chemically modified. The diatomaceous earth product may have a BET surface area of 10-30 m$^2$/g, preferably 12-25 m$^2$/g, or about 15.6 m$^2$/g, or about 23.6 m$^2$/g. The diatomaceous earth product may have a median particle size of 1-20 μm, preferably 2-15 μm, or 3-6 μm, or 8-13 μm. In one embodiment, the diatomaceous earth product is FLOSS K, sourced from Lompoc, California. In one embodiment, the diatomaceous earth product may be a form of diatomaceous earth that has been flux-calcined, calcined, or not calcined. In another embodiment, the opaline silica product is ECOFLAT, sourced from Chile, which contains about 75% opaline silica and 25% diatomaceous earth.

The silica fume may be a waste product having a median particle size of 0.8-2.0 μm, preferably 1.0-1.5 μm, more preferably 1.1-1.3 μm. The silica fume may have a BET surface area of 4-20 m$^2$/g, preferably 6-15 m$^2$/g, more preferably 8-12 m$^2$/g.

In one embodiment, the silica source consists of silica gel and a diatomaceous earth product. In other words, the silica in the synthetic hectorite-type mineral only comes from silica gel and the diatomaceous earth product. In a related embodiment, the silica source consists of silica gel. In another related embodiment, the silica source consists of diatomaceous earth.

In one embodiment, a mass ratio of the silica gel to the diatomaceous earth product is in a range of 1:2-2:1, or 1.0:1.5-1.5:1.0, preferably 1.0:1.2-1.2:1.0, more preferably 1.0:1.1-1.1:1.0, or about 1:1.

In one embodiment, the silica source consists of silica gel, and a mass ratio of the sodium silicate to the silica gel is in a range of 1:2-2:1, or 1.0:1.5-1.5:1.0, preferably 1.0:1.2-1.2:1.0, more preferably 1.0:1.1-1.1:1.0, or about 1:1.

In a preferred embodiment, the synthetic hectorite-type mineral is essentially free of aluminum, for instance, the synthetic hectorite-type mineral may comprise less than 0.1 wt % aluminum, preferably less than 0.05 wt % aluminum, more preferably less than 0.02 wt % aluminum, or about 0.00 wt % aluminum. In some embodiments, other minerals may be substituted for lithium hydroxide and sodium fluoride. For instance, lithium fluoride or sodium hydroxide may be used. In one embodiment, lithium fluoride monohydrate is used, though anhydrous lithium fluoride may be substituted at an equal molar ratio. In alternative embodiments, other metals or ions may be used or doped in, such as aluminum. These alternate metals and ions may be doped in to fill the octahedral sites, to occupy the interlayer, to bind to an exterior or end of a layer, or to occupy a tetrahedral site in the tetrahedral layer.

In a related embodiment, the synthetic hectorite-type mineral is essentially free of iron, for instance, the synthetic hectorite-type mineral may comprise less than 0.1 wt % iron, preferably less than 0.05 wt % iron, more preferably less than 0.02 wt % iron, or about 0.00 wt % iron.

The water may be tap water, distilled water, bidistilled water, deionized water, deionized distilled water, reverse osmosis water, and/or some other water. In one embodiment the water is bidistilled or treated with reverse osmosis to eliminate trace metals. Preferably the water is bidistilled, deionized, deionized distilled, or reverse osmosis water, and at 25° C. has a conductivity of less than 10 μS·cm$^{-1}$, preferably less than 1 μS·cm$^{-1}$; a resistivity of greater than 0.1 MΩ·cm, preferably greater than 1 MΩ·cm, more preferably greater than 10 MΩ·cm; a total solid concentration of less than 5 mg/kg, preferably less than 1 mg/kg; and a total organic carbon concentration of less than 1000 μg/L, preferably less than 200 μg/L, more preferably less than 50 μg/L.

The combined mass of the sodium silicate, a silica source, lithium hydroxide, sodium fluoride in the first mixture may be 10-40 wt %, preferably 15-35 wt % relative to a total weight of the first mixture. The first mixture may be stirred or agitated for a period of 2-30 minutes, preferably 4-10 minutes, in order to ensure even dispersion or dissolution of the reagents.

Then, the magnesium source is added to the first mixture, preferably slowly, and while stirring or agitating the first mixture. In one embodiment, the source of magnesium consists of magnesium carbonate and magnesium oxide. In other words, the source of magnesium is only magnesium carbonate and magnesium oxide. In a related embodiment, the source of magnesium consists of magnesium carbonate (meaning that the source of magnesium is only magnesium carbonate). In another related embodiment, the source of magnesium consists of magnesium oxide (meaning that the source of magnesium is only magnesium oxide). In another embodiment, magnesium chloride is not added or mixed at any point in the method of making the synthetic hectorite-type mineral.

In one embodiment, a mass ratio of magnesium carbonate to magnesium oxide is in a range of 1:2-2:1, or 1.0:1.5-1.5:1.0, preferably 1.0:1.2-1.2:1.0, more preferably 1.0:1.1-1.1:1.0, or about 1:1.

Following the addition of the magnesium source, the mixture may continue to be stirred or agitated for 5-60 min, preferably 8-30 min. The pH of the mixture may then be measured, and an acid, preferably a concentrated acid, is used to reduce the pH of the mixture to a pH in a range of 7.0-11.0, or 7.5-10.7, or 8.0-10.6, or preferably 9.5-10.5, more preferably 9.7-10.3, even more preferably 9.9-10.1, or about 10.0. This produces the second mixture.

In one embodiment, the acid may be an inorganic acid, including, but not limited to, hydrochloric acid, hydrobromic acid, sulfuric acid, sulfamic acid, phosphoric acid, and nitric acid. In another embodiment, the acid may be an organic acid including, but not limited to, acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, isethionic, and mixtures thereof and of the like. In one embodiment, the acid is sulfuric acid. In even more embodiments, other acids not listed above may be used.

The second mixture is heated at a temperature of 200-500° C., 200-300° C., preferably 220-280° C., more preferably 240-260° C., or about 250° C. However, in some embodiments the second mixture may be heated at a temperature lower than 200° C. or higher than 500° C. In one embodiment, in the entire method of making the synthetic hectorite-type mineral as disclosed herein, no reagent, intermediate product, or product exceeds a temperature of 350° C., preferably 320° C., more preferably 280° C., even more preferably 260° C. Preferably, in one embodiment, the second mixture is agitated during the heating, for instance, by stirring.

The second mixture is also held at a pressure of 100-800 psi, 300-600 psi, preferably 350-580 psi, more preferably 400-550 psi, even more preferably 450-530 psi, or about 500 psi. In one embodiment, these pressures are relative pressures, though in another embodiment, the pressures are absolute pressures. However, in other embodiments, the second mixture may be heated at a pressure of less than 100 psi, or even at atmospheric pressure, or may be heated at pressures greater than 800 psi. The pressure and heating may be applied with a pressurized reactor, such as a PARR Reactor, or an autoclave. The pressure and heating may be applied for a time of 0.5-12 h, preferably 1-8 h, more preferably 1-4 h, even more preferably 1.5-2.5 h, or about 2 hours.

This heating of the second mixture produces an intermediary product. Preferably the intermediary product comprises the synthetic hectorite-type mineral in a hydrated, though solid form, and it may be in a mixture of reaction byproducts. The intermediary product may be washed by repeated centrifuging and resuspension, or may be filtered and washed with a filter funnel. Water may be used for the washing, though in some embodiments, an aqueous solution of an alcohol, such as ethanol, methanol, or isopropanol may be used. A ratio of the total mass of fluid used for washing to the mass of the intermediary product may be in a range of 1:1-25:1, preferably 2:1-15:1, more preferably 3:1-12:1. The intermediary product, which may be in the form of a cake, may be dried at a temperature of 80-150° C., preferably 90-130° C., more preferably 100-125° C. for a period of 1-24 h, preferably 2-20 h, more preferably 4-16 h.

Following the drying, the intermediary product may be milled or ground to form the synthetic hectorite-type mineral. The milling or grinding may be with a mortar and pestle, a burr mill, a blade grinder, sandpaper, a ball mill, a planetary ball mill, a disc mill, a puck mill, a jet mill, a conical mill, a hammer mill, or some other milling or grinding machine. Preferably a puck mill is used. The milling may be done for a period of 2-15 min, preferably 3-10 min. Preferably, the milling is performed in order to increase the population of particles having a particle size of smaller than 60 μm, preferably smaller than 50 μm, more preferably smaller than 30 μm as mentioned previously for the synthetic hectorite-type mineral. However, the milling may be carried out to produce particles having some other size range, shape, or to change the average surface area, or the particles may be reshaped by pelletizing and then milled again. In one embodiment, a milled product may be screened through a mesh or sieve to select for particles having a certain size, without the step of milling. The screening or sieving of the particles may include a vibrating screen, a gyrating screen, a trommel screen, or some other mechanical separation device. In one embodiment, the milling may be carried out for a period of time until at least 97%, preferably at least 98%, more preferably at least 99% of the milled particles are able to pass through a 200 mesh.

Aspects of the present disclosure are further illustrated by reference to the following, non-limiting exemplary embodiments presented as numbered paragraphs.

Paragraph 1: A method of making a synthetic hectorite-type mineral, the method comprising: mixing sodium silicate, a silica source, lithium hydroxide, sodium fluoride, and water to form a first mixture; mixing a magnesium source and an acid with the first mixture to form a second mixture, wherein the magnesium source comprises magnesium carbonate and/or magnesium oxide; heating the second mixture to form an intermediary product; and drying and milling the intermediary product to form the synthetic hectorite-type mineral.

Paragraph 2: The method of paragraph 1, wherein the silica source comprises silica gel having a BET surface area in a range of 400-550 m²/g.

Paragraph 3: The method of paragraph 1 or 2, wherein the silica source comprises a diatomaceous earth product.

Paragraph 4: The method of any preceding paragraph, wherein the silica source consists of silica gel, and wherein a mass ratio of the sodium silicate to the diatomaceous earth product is in a range of 1.0:1.2-1.2:1.0.

Paragraph 5: The method of any preceding paragraph, wherein the second mixture is heated at a temperature of 200-500° C. and a pressure of 100-800 psi for 0.5-12 hours to form the intermediary product.

Paragraph 6: The method of any preceding paragraph, wherein a mass ratio of magnesium carbonate to magnesium oxide is in a range of 1.0:1.2-1.2:1.0

Paragraph 7: The method of any preceding paragraph, wherein the second mixture is agitated during the heating.

Paragraph 8: The method of any preceding paragraph, wherein the synthetic hectorite-type mineral is a 2:1 layered phyllosilicate having a tetrahedral double layer sandwiching an octahedral layer, the octahedral layer having a plurality of octahedral sites occupied by $Mg^{2+}$ or $Li^+$, wherein the synthetic hectorite-type mineral has a formula of

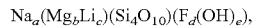

$$Na_a(Mg_bLi_c)(Si_4O_{10})(F_d(OH)_e),$$

wherein a is in a range of 0.3 to 0.4;
wherein b and c range from 0 to 3, and b+c=3, and
wherein d and e range from 0 to 2, and d+e=2.

Paragraph 9: The method of Paragraph 8, wherein a ratio of b to c ranges from 7.0:1 to 9.0:1.

Paragraph 10: The method of Paragraph 9, wherein a ratio of b to c ranges from 7.5:1 to 8.5:1.

Paragraph 11: The method of Paragraphs 8 to 10, wherein at least 90% of the octahedral sites are occupied by $Mg^{2+}$ or $Li^+$, relative to a total number of the octahedral sites.

Paragraph 12: The method of Paragraphs 8 to 11, wherein d is in a range of 0.3 to 0.7.

Paragraph 13: The method of Paragraphs 8 to 13, wherein the synthetic hectorite-type mineral has a $D_{50}$ in a range of 8-30 μm.

Paragraph 14: The method of Paragraphs 8 to 13, wherein the synthetic hectorite-type mineral has a mean crystalline size in a range of 18-38 nm.

Paragraph 15: The method of Paragraphs 8 to 14, wherein the synthetic hectorite-type mineral is in the form of platelets having an aspect ratio in a range of 1.2:1 to 3.0:1.

Paragraph 16: The method of Paragraphs 8 to 15, wherein the synthetic hectorite-type mineral has a swell index of at least 55 mL, the swell index according to ASTM D5890.

Paragraph 17: The method of Paragraphs 8 to 16, wherein a suspension comprising 5 wt % of the synthetic hectorite-type mineral in water, relative to a total weight of the suspension, has a yield point of at least 290 Pa.

Paragraph 18: The method of Paragraphs 8 to 17, wherein a suspension comprising 5 wt % of the synthetic hectorite-type mineral in water, relative to a total weight of the suspension, has a yield stress in a range of 350-450 Pa at a temperature of 50-85° C.

Paragraph 19: The method of Paragraphs 8 to 18, wherein a suspension comprising 2 wt % of the synthetic hectorite-type mineral in water, relative to a total weight of the water, has a cation exchange capacity in a range of 95-130 meq per 100 g synthetic hectorite-type mineral.

Paragraph 20: A synthetic hectorite-type mineral made by the method of any preceding Paragraph.

The examples below are intended to further illustrate protocols for preparing, characterizing the synthetic hectorite-type mineral, and uses thereof, and are not intended to limit the scope of the claims.

Example 1

Feeds and Feed Preparation

The materials and chemicals used in preparation of the reaction feeds for the hydrothermal reactions are listed in Table 1.

TABLE 1

Chemicals and materials used in present study

| Materials/Chemicals | Grade Name | Origin/Manufacturer | Notes |
|---|---|---|---|
| Synthetic xerogel | Britesorb D300 | PQ Corp. | |
| Sodium silicate | N-clear | PQ | |
| Diatomaceous Earth | Floss K | Lompoc, CA USA | Scrubber fines |
| Diatomaceous Earth | Ecoflat* | Chile | Waste fines |
| Silica Fume | Metal Casting | Germany | |
| Talc | Jetfine 3CW | Imerys | Calcined before use |
| Talc Tailings | Vertal AF | Vermont, USA | Calcined before use |
| Magnesium Carbonate, MgCO3 | Lab Grade | Acros Organics | |
| Magnesium Oxide, 98% | ACS | Acros Organics | |
| Sodium Fluoride | Analytical Grade | Mallinckrodt | |
| Lithium Hydroxide Monohydrate | ACS | Alfa Aesar | |
| Sodium Hydroxide | ACS | Sigma Aldrich | |
| Sulfuric Acid, 96% | ACS | Merck | |
| Glacial Acetic Acid | HPLC | BDH VWR Analytical | |

*Ecoflat is an opaline silica, with about 75% opal and 25% diatomaceous earth.

In general, for each batch of the reactions, the reaction feed slurry or sol contained the following molar quantities: 0.42 moles of silica, 0.30 moles of magnesium from magnesium carbonate and magnesium oxide, 0.13 moles of sodium, 0.07 moles of fluoride, and 0.048 moles of lithium. For fast sol-gel preparation, the total silica source was split 50:50 between a powdered silica source (e.g. BRITESORB® D300) and a sodium silicate solution (e.g., PQ's N® Clear).

For example, in preparation of the reaction feed for the 600-mL reactor, assuming pure silica source, like BRITESORB® D300, and pure magnesium sources are used, the following amounts of materials/chemicals are used:
a. 43.50 g PQ N® Clear
b. 12.50 g PQ BRITESORB® D300
c. 3.00 g Sodium Fluoride
d. 2.00 g Lithium Hydroxide Monohydrate
e. 250 mL Deionized Water
f. 13.68 g Magnesium Carbonate
g. 6.66 g Magnesium Oxide
h. Dropwise adding 96% Sulfuric acid to adjust pH to 10 (alternatively, use glacial acetic acid.)

The general feed preparation procedures for the sol-gel feeds are described as follows:
1. Combine N® Clear sodium silicate, BRITESORB® D300, Lithium Hydroxide Monohydrate, and Sodium Fluoride in a 600 mL beaker containing a stir bar. Add 200 mL DI water into this mixture and stir at 300 rpm for 5 minutes. This is to ensure that most powdered reagent added to this point is dissolved or well dispersed.
2. Weight out the magnesium sources. Add the magnesium carbonate and magnesium oxide into the beaker. Since the slurry is highly alkaline, these alkaline powders will not readily be dissolved.
3. Using a pH probe, adjust the pH of the well mixed slurry to about 10.0 with an acid.
4. Once the pH drops at about pH 10, the slurry will behave like a sol. Once this gelation occurs, it is difficult to adjust the pH without proper agitation.
5. Transfer the sol-gel feed into the Parr reactor for hydrothermal reaction.

It should be noted that when a natural DE material was used as the alternative silica source, the required lithium would be ~2.5× higher in concentration, i.e., about 0.125 moles of lithium is required. Table 2a and 2b listed the feeds used in various batches of reactions.

For the magnesium sources used in the synthesis, in addition to relatively pure magnesium carbonate and magnesium oxide, magnesium from natural sources can be used. For example, magnesite can be thermally treated to be converted to MgO. However, the impacts of the impurities, such as the iron containing minerals on colors would need to be assessed.

TABLE 2a

Records of selected reactions with silica gels

| RxN Code | N-Clear (g) | BriteSorb D300 (g) | MgO (g) | NaF (g) | LiOH·H2O (g) | $H_2SO_4$, 96%. (mL) |
|---|---|---|---|---|---|---|
| 107-1 | 43.83 | 12.39 | 12.52 | 2.97 | 5.45 | 11 |
| 107-2 | 43.75 | 12.4 | 12.61 | 2.98 | 5.29 | 7.5 |
| 107-3 | 43.22 | 12.34 | 12.42 | 3.35 | 5.26 | 6.5 |
| 107-4 | 43.52 | 12.7 | 12.16 | 2.98 | 5.16 | 6.5 |
| 107-5 | 26.71 | 6.4 | 6.29 | 1.49 | 2.79 | 4.0 |
| 107-6 | 26.36 | 6.21 | 6.21 | 1.55 | 2.74 | 4.0 |
| 107-7 | 22.18 | 6.34 | 6.34 | 1.57 | 3.06 | 4.0 |
| 107-8 | 21.33 | 6.41 | 6.40 | 2.99 | 2.88 | 6.0 |
| 107-9 | 21.36 | 6.37 | 6.50 | 1.51 | 2.61 | 3.0 |
| 107-10 | 21.86 | 6.42 | 6.56 | 1.84 | 2.63 | 3.0 |
| 107-11 | 43.96 | 12.34 | 12.55 | 3.0 | 5.22 | 7.5 |

TABLE 2b

Selected Reaction Feeds

| RxN Code | N-Clear (g) | Silica Source (g) | MgO (g) | MgCO3 (g) | NaF (g) | LiOH·H2O (g) | NaOH (g) | $H_2SO_4$ conc.96% (mL) |
|---|---|---|---|---|---|---|---|---|
| 130-1 | 21.31 | 10.97 (PM enstatite) | | 4.5 | 1.5 | 2.49 | | 3.2 |

TABLE 2b-continued

Selected Reaction Feeds

| RxN Code | N-Clear (g) | Silica Source (g) | MgO (g) | MgCO$_3$ (g) | NaF (g) | LiOH · H$_2$O (g) | NaOH (g) | H$_2$SO$_4$ conc.96% (mL) |
|---|---|---|---|---|---|---|---|---|
| 130-2 | 43.36 | 12.99 (PM silica fume) | | 27.08 | 2.98 | 5.22 | 3.06 | 8 |
| 130-3 | 21.36 | 9.30 (PM perlite) | | 13.63 | 1.49 | 2.53 | | 3 |
| 130-4 | 21.58 | 6.85 (PM flossK) | | 13.71 | 1.48 | 2.57 | | 2.5 |
| 130-7 | 21.79 | 6.59 (Britesorb D300) | 6.27 | | 1.5 | 2.51 | | 3 |
| 130-10 | 21.9 | 6.51 (Britesorb D300) | 6.42 | | 1.51 | 2.57 | | 9 |
| 130-13 | 21.72 | 6.39 (Britesorb D300) | 6.53 | | 1.57 | 2.66 | | 7 |
| 130-14 | 21.39 | 6.48 (Britesorb D300) | 1.66 | 10.29 | 1.57 | 2.68 | | 3 |
| 130-15 | 21.49 | 6.23 (Britesorb D300) | 3.91 | 3.22 | 1.53 | 2.59 | | 3 |
| 130-16 | 21.29 | 6.50 (Britesorb D300) | 3.3 | 6.35 | 1.50 | 2.48 | | 3 |
| 130-17 | 43.88 | 12.43 (Britesorb D300) | 3.11 | 18.42 | 3.00 | 5.25 | | 6 |
| 130-18 | 43.51 | 12.4 (Britesorb D300) | 6.67 | 13.72 | 3.09 | 5.44 | | 6 |

Example 2

Apparatus and Methods

Apparatus

Without going to details on the equipment and their use, the apparatus and instruments used in the present studies are listed below:
1. PARR Reactor 4563 Pressure Reactor 600 mL (316SS and Carpenter 20) 4835 Controller
2. pH/Conductivity Meter ACCUMET® XL500
3. ICP-OES Agilent 5100
4. XRD Philips X'pert
5. XRF Thermo ARL Advant'x–0336
6. Rheometer, Aton Paar MCR 102

Methods

1. Hydrothermal Reaction

The hydrothermal reactions were conducted with a PARR Reactor 4563, which has a volume capacity of 600-mL. The reactions were typically conducted at 250° C. and 500 psi for 2 hours with agitation speed of 350 rpm. After each reaction, the reaction products were filtered with a Buchner Funnel and rinsed with DI water for three times, with about 200 mL each time. Then, the cake was dried at 105° C. overnight. After drying, the solid lumps were milled with a puck-mill for 300 seconds, and the powdered materials were then used for various tests.

The synthesis flow chart shown in FIG. 1 illustrates the stepwise sample preparation, hydrothermal reaction and the followed filtration-rinsing-drying and milling processes.

2. Swell Index Measurement

The Swell Index or Free Swell test procedure is used to determine the general swelling characteristics of sodium bentonite clay. Here, we use this method to estimate the swelling index of the synthetic hectorite samples. The swelling index of the products were measured according to ASTM D5890, in which 2 grams of a dried and finely ground sample is dispersed into ~80 mL water in a 100-mL graduated cylinder in approximately 0.1 g increments. A minimum of 10 minutes must pass between additions to allow for full hydration and settlement of the clay to the bottom of the cylinder. These steps are followed until the entire 2 g sample has been added to the cylinder. The sample is then covered and protected from disturbances for a period of 16-24 hours, at which time the level of the settled and swollen clay is recorded to the nearest 0.5 mL.

3. Conductivity Measurement

The conductivity was measured with an ACCUMET® XL500 pH/Conductivity meter. In preparing the sample, 2 g of a sample is dispersed in 100 mL DI water (~2% by weight), shaken for 30 minutes on a GYROMAX 737 shaker at 380 rpm to ensure full dispersion before measurement. To estimate the total dissolved solids, the 2% slurry can be filtered and the cake washed with DI water to a total volume of 1 liter. The filtrate solution typically has a conductivity around 750 µS/cm.

4. Rheological Property Measurement

The rheological property of the synthetic hectorite was measured on an ATON PAAR MCR 102 Rheometer with a PP25 spindle. Typically, 5% sample loading was used for synthetic hectorite samples and Laponite®, which was used as a reference. In preparing the sample, 1.25 g of a powdered sample was added to a 50 mL centrifuge tube with about 24 mL of DI water so that the total weight is 25 grams. The samples were vortexed immediately to prevent setting of the synthetic clay, then placed in a cushioned container and placed in the GYROMAX 737 shaker shaken at 380 rpm for 30 minutes or longer. Thereafter, samples were left on the counter overnight. It is important to test samples the following day because there is an aging effect in these samples, where the yield stress tends to increase. The measurement was conducted in rotational mode at room temperature, and with shear stress setting of 1 to 600 Pa.

Example 3

Results and Discussion
Material Characterizations

The primary purpose of this study is to synthesize a hectorite type of inorganic material that exhibits similar or superior rheological performance properties as compared to the commercial Laponite®. The primary screening after a sample has been synthesized is always on the performance properties, i.e. swelling index and yield stress. Therefore, this invention will focus on the rheological properties of the synthetic hectorite. For selected samples, comprehensive characterizations were performed to reveal the chemical and physical properties of the samples.

1. Bulk Chemical Compositions

The bulk chemical compositions of selected synthetic hectorite samples are summarized in Table 3. The empirical mineral formulas of these samples are shown in Table 4.

TABLE 4

Empirical hectorite formulas calculated from bulk chemical compositions.

| Reaction Code | Comments | Empirical Formula |
|---|---|---|
| Laponite ® | As received | Na0.4(Mg2.5, Li0.5)Si4O10(OH)2 |
| 130-22 | Optimal (50% MgO/ 50% MgCO3) | Na0.4(Mg2.6, Li0.4)Si4O10(OH)1.5F0.5 |
| 182-16 | 40:60 MgCO3:MgO | Na0.4(Mg2.7, Li0.3)Si4O10(OH)1.6F0.4 |
| 143-2 | No lithium | Na0.5Mg3Si4O10(OH)18F0.2 |
| 143-3 | No lithium or fluorine | Na0.3Mg3Si4O10(OH)2 |
| 143-4 | No fluorine | Na0.3(Mg2.9, Li0.1)Si4O10(OH)2 |
| 130-14 | 25% MgO/ 75% MgCO3 | Na0.2(Mg2.8, Li0.2)Si4O10(OH)1.7F0.3 |
| 142-1 | 100% MgCO3, 100% Sodium Silicate | Na0.4(Mg2.4, Li0.6)Si4O10(OH)1.5F0.5 |
| 148-1 | Acetic Acid | Na0.2(Mg2.8, Li0.2)Si4O10(OH)1.6F0.4 |
| 130-19 | Floss K | Na0.2(Mg2.8, Li0.2)Si4O10(OH)1.7F0.3 |
| 130-21 | Ecoflat | Na0.2(Mg2.7, Li0.3)Si4O10(OH)1.6F0.4 |
| 130-1 | Calcined Talc | Na0.4(Mg2.4, Li0.6)Si4O10(OH)1.6F0.4 |
| 130-23 | Silica Fume | Na0.3(Mg2.7, Li0.3)Si4O10(OH)1.6F0.4 |
| 16-4 | Calcined Talc Tailings | Na0.3(Mg2.3, Li0.7)Si4O10(OH)1.7F0.3 |

*Stoichiometrically, the lithium within crystal lattice is calculated by subtracting 3 from magnesium. The excess lithium of >0.33 are the lithium contained in the interlayer or as being adsorbed on the surfaces for the clay. Lithium molar contents of less than 0.33 may indicate poor crystallization.
**Measured lithium and magnesium contents did not add up to 3, therefore, it is deduced that iron is the likely substitute.

2. XRD Scans and Estimated Crystalline Sizes

Figure 2A:
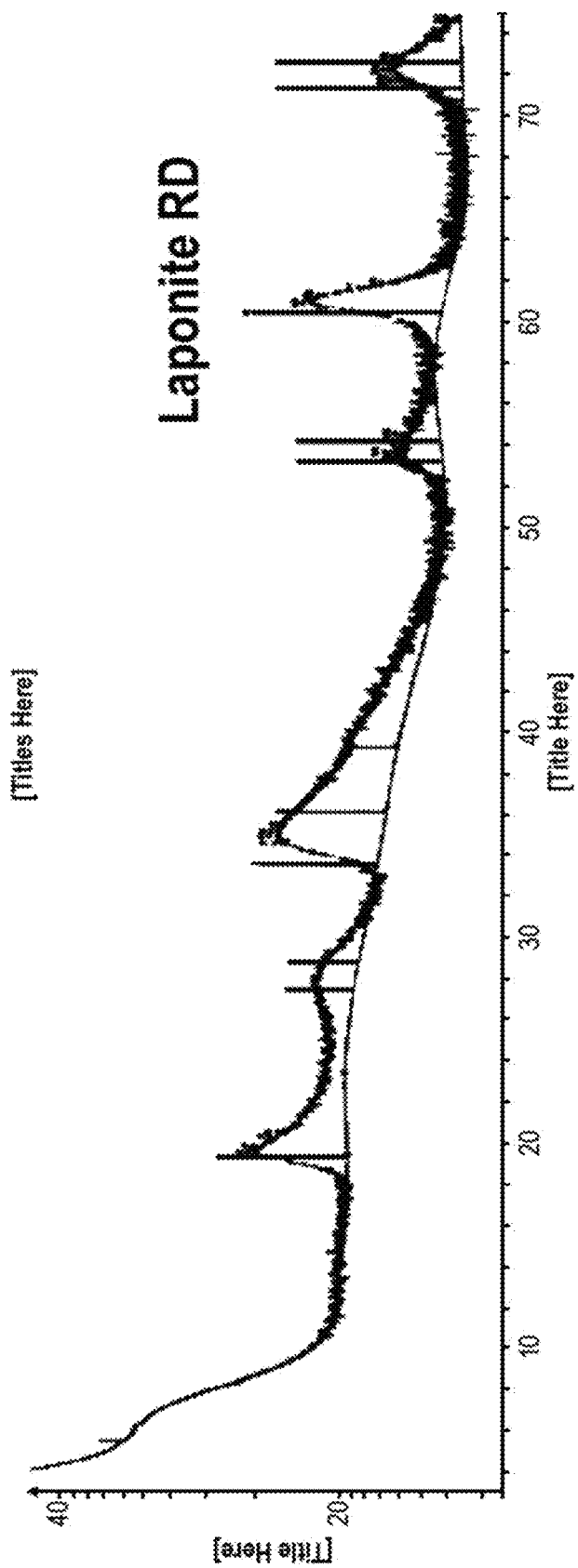
FIG. 2A shows the XRD patterns of Laponite® RD.
Figure 2B:
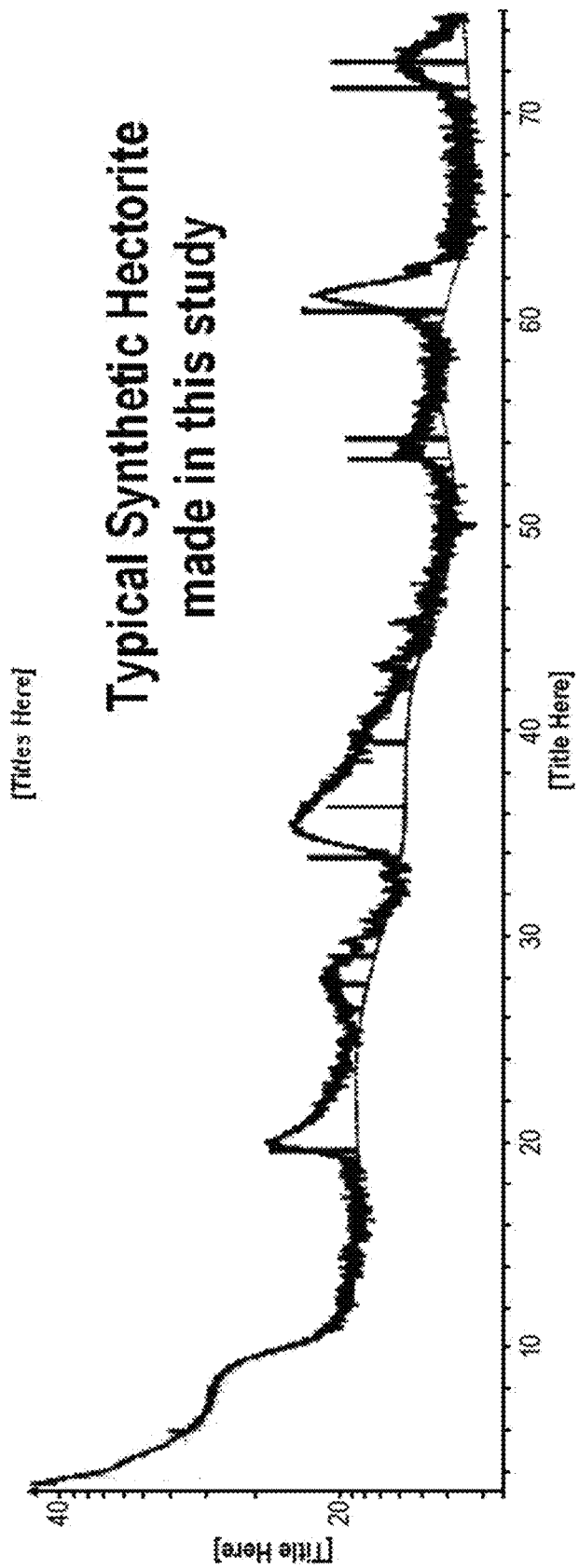
FIG. 2B shows the XRD patterns of the typical hectorite synthesized in this study.

The typical XRD patterns of the synthetic hectorite and Laponite® RD are shown in FIGS. 2A and 2B. As shown in FIG. 2A, Laponite® RD showed sheet-like or clay like structure with broad peaks overlapping with the XRD patterns of hectorite. The typical XRD pattern of the synthetic

TABLE 3

Bulk chemical compositions of selected synthetic clays by XRF (%)

| Reaction Code | Comments | SiO$_2$ | MO | Na$_2$O | F | Li$_2$O* | SO$_3$ | CaO | Al$_2$O$_3$ | Fe$_2$O$_3$ | P$_2$O$_5$ | TiO$_2$ | SUM |
|---|---|---|---|---|---|---|---|---|---|---|---|---|---|
| Laponite ® | As received | 66.54 | 27.45 | 3.05 | 0 | 2.27 | 0.35 | 0.17 | 0.04 | 0.04 | 0.06 | 0.02 | 100 |
| 130-22 | Optimal (50% MO/ 50% MgCO3) | 63.63 | 28.02 | 3.56 | 2.44 | 1.51 (1.40) | 0.54 | 0.16 | 0.05 | 0.03 | 0.03 | 0.01 | 100 |
| 182-16 | 40:60 MgCO3:MgO | 63.67 | 29.2 | 3.37 | 1.9 | 1.08 | 0.54 | 0.12 | 0.05 | 0.03 | 0.01 | 0.01 | 100 |
| 143-2 | No lithium | 63.31 | 30.81 | 4.12 | 1.13 | 0 | 0.27 | 0.16 | 0.08 | 0.06 | 0.04 | 0.02 | 100 |
| 143-3 | No lithium or fluorine | 64.25 | 32.53 | 2.79 | 0 | 0 | 0.08 | 0.16 | 0.07 | 0.07 | 0.03 | 0.02 | 100 |
| 143-4 | No fluorine | 64.53 | 31.04 | 1.78 | 0 | 0.56 | 1.76 | 0.16 | 0.07 | 0.04 | 0.04 | 0.02 | 100 |
| 130-14 | 25% MO/ 75% MgCO3 | 65.22 | 30.28 | 1.5 | 1.53 | 0.97 | 0 | 0.21 | 0.11 | 0.1 | 0.05 | 0.03 | 100 |
| 142-1 | 100% MgCO3, 100% Sodium Silicate | 64.33 | 25.89 | 3.28 | 2.63 | 2.43 | 1.01 | 0.13 | 0.14 | 0.07 | 0.06 | 0.04 | 100 |
| 148-1 | Acetic Acid | 65.06 | 30.28 | 1.7 | 1.18 | 0.94 | 0 | 0.17 | 0.44 | 0.06 | 0.06 | 0.12 | 100 |
| 130-19 | Floss K | 63.09 | 30.21 | 1.98 | 1.3 | 0.6 | 0 | 0.33 | 0.14 | 1.57 | 0.67 | 0.1 | 100 |
| 130-21 | Ecoflat | 63.97 | 29.17 | 2.04 | 1.87 | 1.15 | 0 | 0.5 | 0.1 | 0.8 | 0.33 | 0.07 | 100 |
| 30-1 | Calcined Talc | 64.48 | 25.88 | 2.92 | 2.03 | 2.47 | 0.53 | 0.1 | 0.16 | 1.4 | 0.03 | 0.01 | 100 |
| 130-23 | Silica Fume | 62.36 | 28.53 | 2.66 | 2.01 | 1.09 | 0.37 | 0.15 | 0.13 | 0.46 | 0.32 | 0.02 | 100 |
| 16-4 | Calcined Talc Tailings | 61.46 | 24.12 | 2.63 | 1.66 | 2.55 | 2.02 | 0.23 | 0.24 | 4.94 | 0.02 | 0.02 | 100 |

*Lithium contents were analyzed according to US-EPA method 6010 by Krause Analytical after sample digestion according to US-EPA method 3051A.

hectorite made in this study is very similar to that of the Laponite® RD and with peaks match the peak positions of hectorite (FIG. 2B).

It should be noted that, the broad peaks of these XRD scans reflect the fact that the clay crystals formed in these hydrothermal reactions are rather small, usually in nanometers. Laponite® RD was cited to have a mean particle size of 25 nm. See Kloprogge, et al. and Torii K. et al. each incorporated herein by reference in their entirety. The similarity of the XRD patterns of the synthetic clays made in this study to that of Laponite® RD suggested that the similar range of crystal sizes were formed.

$$L = \frac{K\lambda}{B(2\theta)\cos(\theta)} \quad (2)$$

or, $$L = \frac{0.9 \times 0.15406 \text{ (nm)}}{B(2\theta)\cos(\theta)} \quad (3)$$

(assuming $K = 0.9$ and $\lambda = 1.5406$ Å or $0.15406$ nm)

According to the above XRD peak broadening equation, the estimated crystalline sizes for both the Laponite® and the synthetic hectorite made in this study are rather similar (Table 5).

TABLE 5

Estimated crystalline sizes of the synthetic hectorite.

| Rxn No | Comments | 2θ | θ | FWHM (2θ) | FWHM (Radians) | Cos (θ) | λ (nm) | Crystalline size (nm) |
|---|---|---|---|---|---|---|---|---|
| Laponite ® | Reference | 61.1 | 30.6 | 1.01 | 0.0088 | 0.8612 | 0.154 | 24.9 |
| 130-22 | Optimal (50% MgO/ 50% MgCO₃) | 61.0 | 30.5 | 0.71 | 0.0062 | 0.8618 | 0.154 | 35.6 |
| 143-2 | No lithium | 60.6 | 30.3 | 0.85 | 0.0074 | 0.8633 | 0.154 | 29.6 |
| 143-3 | No lithium or fluorine | 60.8 | 30.4 | 1.04 | 0.0091 | 0.8625 | 0.154 | 24.1 |
| 143-4 | No fluorine | 61.0 | 30.5 | 0.80 | 0.0070 | 0.8617 | 0.154 | 31.3 |
| 130-14 | 25% MgO/ 75% MgCO₃ | 61.1 | 30.5 | 0.84 | 0.0073 | 0.8612 | 0.154 | 29.9 |
| 142-1 | 100% MgCO₃, 100% Sodium Silicate | 61.3 | 30.6 | 0.76 | 0.0066 | 0.8603 | 0.154 | 33.0 |
| 148-1 | Acetic Acid | 61.3 | 30.6 | 1.27 | 0.0111 | 0.8603 | 0.154 | 19.7 |
| 130-19 | Floss K | 61.2 | 30.6 | 0.73 | 0.0064 | 0.8605 | 0.154 | 34.2 |
| 130-21 | Ecoflat | 61.3 | 30.6 | 0.84 | 0.0073 | 0.8604 | 0.154 | 29.9 |
| 30-1 | Talc | 61.5 | 30.7 | 0.97 | 0.0085 | 0.8596 | 0.154 | 25.8 |
| SGS P4 | 2L Production | 61.2 | 30.6 | 0.81 | 0.0071 | 0.8608 | 0.154 | 31.0 |

Based on the powder XRD patterns, the crystal size of these clays can be estimated through the use of the Scherrer Equation:

$$B(2\theta) = \frac{K\lambda}{L\cos(\theta)} \quad (1)$$

See P. Scherrer 1918), "Bestimmung der Grösse und der inneren Struktur von Kolloidteilchen mittels Röntgenstrahlen," Nachr. Ges. Wiss. Göttingen 26 pp 98-100, incorporated herein by reference in its entirety.

Where, B is the peak full width at half maximum (FWHM), in 2θ radians, K is the Scherrer constant or shape factor (typically vary from 0.62 to 2.08), λ is the wavelength of X ray used, L is the crystalline size. If assuming K=0.9, the simplified equation leads to:

In a way, XRD patterns may only indicate the presence of the nano size clays that fit to the clay patterns. What more important for practical purpose, are the rheological properties of these synthetic clay materials, which are affected not only by the crystalline sizes, but also the sizes of the lumps or granulates. The sections that follow will focus on the rheological properties.

3. Colors

The colors of the selected powdered synthetic hectorite samples made from different silica sources are shown in Table 6. The synthetic hectorite made from silica gel led to a relatively high blue light brightness. When other minerals were used, the colors of the products were impacted by the presence of other impurities.

TABLE 6

Color measurements of synthetic hectorite powders made with different silica sources

| Reaction Code | Name | Silica Source | L | a | b | Brightness |
|---|---|---|---|---|---|---|
| | Laponite ®RD, as received | | 95.39 | −0.24 | 2.53 | 87.5 |
| 1304-L-98-6 | Synthetic Hectorite | Silica Gel | 97.43 | −0.32 | 2.07 | 92.0 |
| 142-130-20 | Synthetic Hectorite | Silica Fume | 93.89 | −0.73 | 1.97 | 85.5 |
| 142-130-12 | Synthetic Hectorite | Floss K | 85.45 | 0.80 | 6.42 | 65.2 |
| 142-130-3 | Synthetic Hectorite | Perlite | 95.56 | 0.14 | 3.67 | 86.3 |
| 142-130-1 | Synthetic Hectorite | Talc | 87.51 | 1.96 | 10.58 | 63.4 |
| 142-16-4 | Synthetic Hectorite | Tailings 2 | 74.37 | 4.40 | 20.84 | 33.2 |

It should be noted that the swelled Laponite® RD at 2% loading typically gives a nearly transparent gel-like paste, while the swelled synthetic hectorite made from silica gel shows a translucent white color. The colors made from other mineral silica sources were strongly affected by the presence of impurities in each mineral source, especially the Fe2O3 contents in these minerals.

4. Particle Sizes

The powdered synthetic hectorite show a multimodal particle size distribution (FIG. 3) and this is apparently related to the method of pulverization, i.e., puck milling. The D50 of the powdered synthetic hectorite samples are about 11-26 microns (Table 7). It should be noted that, due to the high swelling properties of these powdered samples in water, the particle size distributions were measured with dry powder methods.

TABLE 7

Particle size distribution of synthetic hectorite

| % Pass | 142-156-6 Size (um) | 142-156-11 Size (um) |
|---|---|---|
| 10 | 1.055 | 0.884 |
| 20 | 2.312 | 1.462 |
| 30 | 6.13 | 2.65 |
| 40 | 14.13 | 5.46 |
| 50 | 26.5 | 11.32 |
| 60 | 42.13 | 19.58 |
| 70 | 59.48 | 28.78 |
| 80 | 84.09 | 42.31 |
| 90 | 169.5 | 92.91 |
| 95 | 269.3 | 212.3 |

Example 4

Rheological Properties

1. Viscosity and Yield Point

The major performance advantage of hectorite is its unusual rheological properties, especially the high viscosity, even under relatively high shear stress or shear rate. The commercially available synthetic hectorite, i.e., Laponite®, shows superior performance than the natural hectorite. Thus, the synthetic hectorite samples made in the present study are compared to Laponite® RD, the most common grade of Laponite® series of rheological modifiers.

Sample preparation has considerable influence on the results of the rheological measurement. Therefore, sample preparation should always be carried out in the same way every time. This improves the reproducibility of measuring data. For some samples, especially the natural bentonite and hectorite clays, high sample loadings of 15% may be needed in order to measure and compare the viscosity in the same ranges of the synthetic hectorite and Laponite®. Generally, sample preparation has little influence on measurements at shear rates over 10 $s^{-1}$.

Sample preparation includes removing the sample paste of a given solid loading from the container, shaking or stirring it, filling it into the measuring system, positioning the measuring system as well as the subsequent waiting time or a pre-defined shear before starting the actual measurement. The term 'viscosity' gives information on how thick a fluid is and how easily it flows, which is the measure of a fluid's internal flow resistance. It is the resistance that a fluid shows when being deformed. Many liquid, gel-like, or semi-solid everyday substances are typically characterized by measuring its viscosity, flow curve, and yield point using rotational viscometers/rheometers. For examples, water is a typical liquid with a low viscosity and has no yield point. Honey on the other hand has a higher viscosity and a yield point. The yield point tells how much force needs to be applied so that the material starts to flow. The yield point (also called yield stress) is the lowest shear-stress value above which a material will behave like a fluid, and below which the material will act like a solid. See ISO 3219:1994-10, Plastics—Polymers/resins in the liquid state or as emulsions or dispersions—Determination of viscosity using a rotational viscometer with defined shear rate; and Mezger, T. (2011). The Rheology Handbook. 3rd revised ed. Hanover: Vincentz Network, each incorporated herein by reference in their entirety.

When a viscosity flow curve is measured with a rotational viscometer and the yield point can be calculated. The viscosity of a fluid is the measure of its resistance to gradual deformation by shear stress, T. With a viscosity curve, the viscosity q is usually plotted on the y-axis and the shear stress on the x-axis. Most samples show shear-thinning behavior. This means the viscosity decreases with increasing shear stress. A shear stress is the component of stress coplanar with a material cross section. Shear stress arises from the force vector component parallel to the cross section of the material. The yield point is the minimum force that must be applied to those samples so that they start to flow. In other words, beyond the yield point, the viscous paste sample starts to loss it viscosity and more behavior like a liquid. Typical examples of materials that have a yield point are creams, ketchup, toothpaste, and sealants.

Yield point, in mechanical engineering, is the load at which a solid material that is being stretched begins to flow, or change shape permanently, divided by its original cross-sectional area; or the amount of stress in a solid at the onset of permanent deformation. The yield point, alternatively called the elastic limit, marks the end of elastic behavior and the beginning of plastic behavior. When stresses less than the yield point are removed, the material returns to its original shape. For many materials that do not have a well-defined yield point, a quantity called yield strength is substituted.

Substances with a yield stress only start to flow once the outside forces acting on them are larger than their internal structural forces. Below the yield point the substance shows elastic behavior (gel character). It behaves like a solid that reacts to load with a small deformation which completely regenerates when the load is removed. The material therefore behaves like a spring having a recoiling force which is proportional to the deflection. When shear forces are increased, the yield stress can be overcome so that irreversible deformations are present and the sample starts to flow.

The yield point is of vital importance for many practical issues and applications, e.g. for quality control of final products or for optimizing the production process.

Figure 4A:
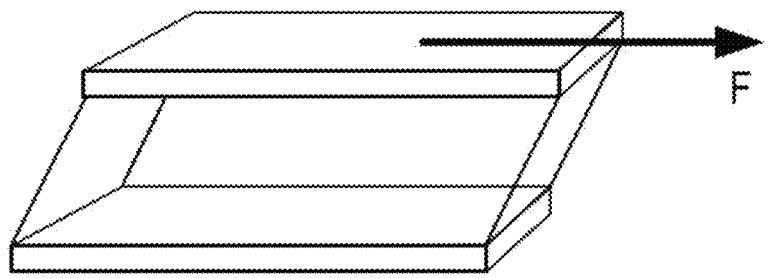
FIG. 4A illustrates the relationship of shear stress (i) to the force applied along the direction parallel to the sample plane (F) and the sample area (A).
Figure 4B:
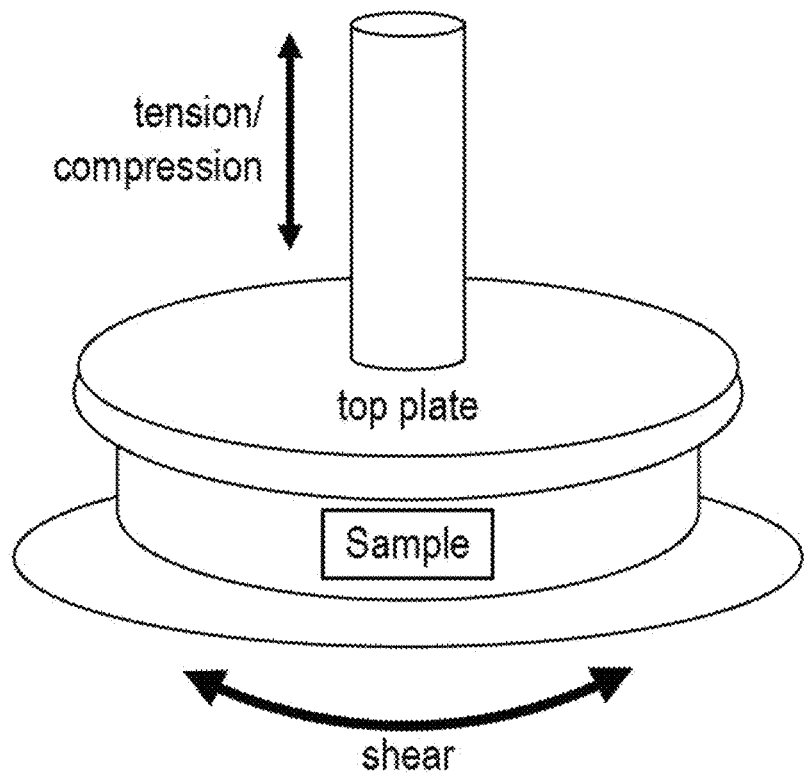
FIG. 4B illustrates the rotational mode of shear stress measurement.
Figure 4C:
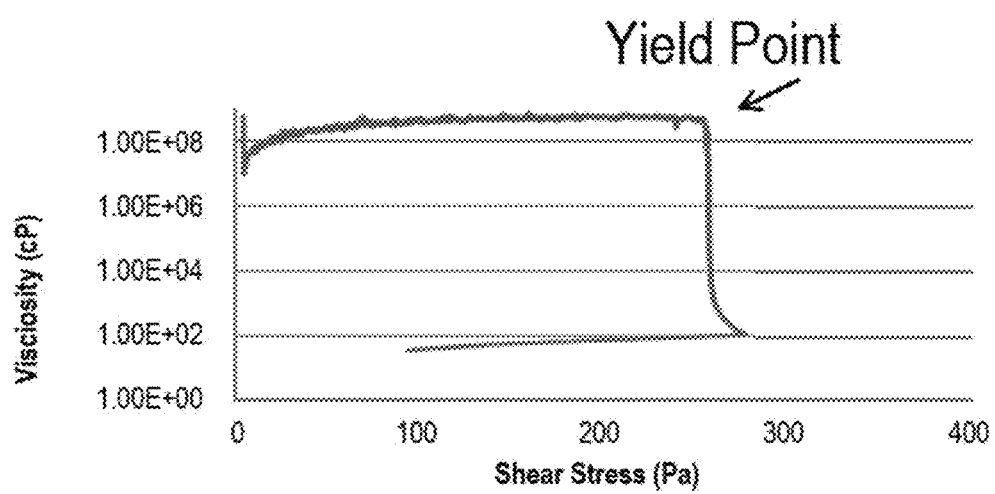
FIG. 4C illustrates a typical flow curve with yield point indicated.

FIGS. 4A-4C show the relationship of shear stress to the force applied and the area, the rotational mode of measurement and the typical flow curve with yield point indicated.

2. Swell Index

The Swell Index, or Free Swelling Property, is used to determine the general swelling characteristics of sodium bentonite clay. Sodium bentonite clay is widely known for its high swelling characteristics. Typical sodium bentonite clay has the ability to absorb 4-5 times its own weight in water and can swell 5-15 times its dry volume at full-unconfined saturation. The strong swelling tendency of Li-containing smectite may be related to the strongest hydration energy of lithium ions, as compared to other alkali ions as the interlayer counter ions. It is well-known that clay swelling strongly depends on the type of the interlayer counter ions. For instance, K+-containing clays show a lower tendency to swell than Na+-containing ones, whereas Li+-containing smectites show the highest swelling. See Emiel J. M. Hensen and Berend Smit (2002) Why clays swell, J. Phys. Chem. B 106, 12664-12667; Newman, A. C. D. (1987) Chemistry of Clays and Clay Minerals, Mineralogical Society: London; and Tamura, K.; Yamada, H.; Nakazawa, H. (2000) Clays Clay Miner, 48, 400-404, each incorporated herein by reference in their entirety. For potassium, the interaction with water is too weak, leading to the preferential formation of inner-sphere complexes independent of the location of the layer charge. This explains the efficiency of the use of KCl solutions as shale swelling inhibitors in drilling fluids. See Denis, J. H.; Keall, M. J.; Hall, P. L.; Meeten, G. H. (1991) Clay Miner., 26, 255-268, incorporated herein by reference in its entirety.

The stronger swelling tendency of Li-containing smectite may be related to the strongest hydration energy of the three discussed alkali ions. For hectorite, in addition to the Li$^+$ ion distributed in the interlayers, the Li$^+$, as well as Mg$^{2+}$ in the trioctahedral occupation in the octahedral layers help on the more even distribution of the interlayer charges, which lead to the more homogeneous distribution of the negative charges and the associated counter ions. Thus, it enhances the more homogeneous and higher swelling.

Figure 5:
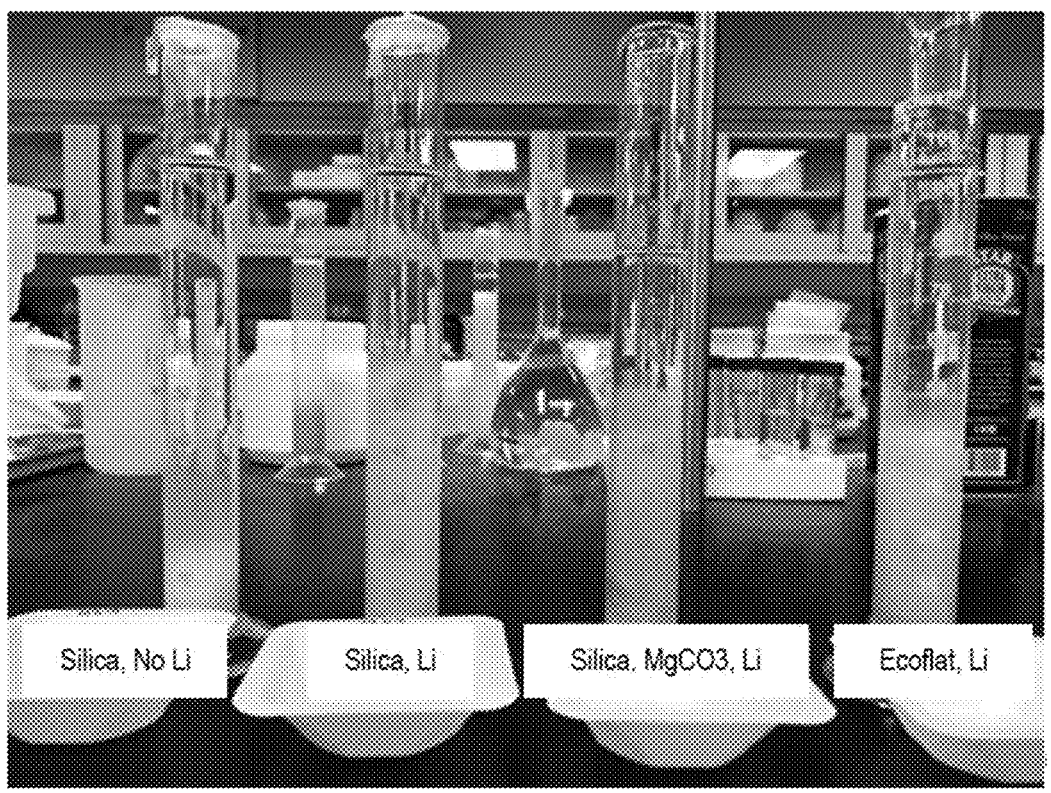
FIG. 5 is a photo illustrating the swelling volumes of different synthetic clay samples during the optimization of the formulation of reaction feeds.

The high and low values in swell index, in essence, reflect the continuous hydration in natural smectite interlayers or relates to the randomness in layer stacking which is probably caused by a heterogeneous charge distribution in the 2:1 layers. The strength of the intra-particulate interactions and the particle sizes will also play a role. Small particle sizes and stronger interactions help to build a high volume swell index. FIG. 5 shows the photo taken during the actual swell index measurements.

The swelling of clays can be regarded as intra-particles or intra-molecular interactions which cause a three-dimensional network of forces that give the swelled bulk material a certain structural strength. When the structural strength of the 3D network is much stronger than the weight it supports, the swelling is stable and show as a high swell index. As related to viscosity, this network of forces is destroyed when the yield point is overcome. Therefore, the swell index reflects the volume expansion as well as strength of the interaction of the 3D network built by the particles.

Therefore, in the following discussion, the major properties that were used to compare the performance of the synthetic rheological modifiers are swell index, viscosity and yield point, and the performance of the samples synthesized are always compared to that of the commercial Laponite®, which is used as the bench mark throughout the present study.

This study discovered that, after the reaction feeds were studied with proper MgO/MgCO$_3$ and total Mg/Si ratios, and proper amount of lithium and fluorine, the products from the hydrothermal reactions showed extraordinarily high viscosity and yield point as compared to the bench mark of Laponite® RD. In the following sections, the different aspects of the formulation optimization are discussed.

3. Magnesium Feeds, i.e., MgO and MgCO$_3$, etc.

Figure 6:
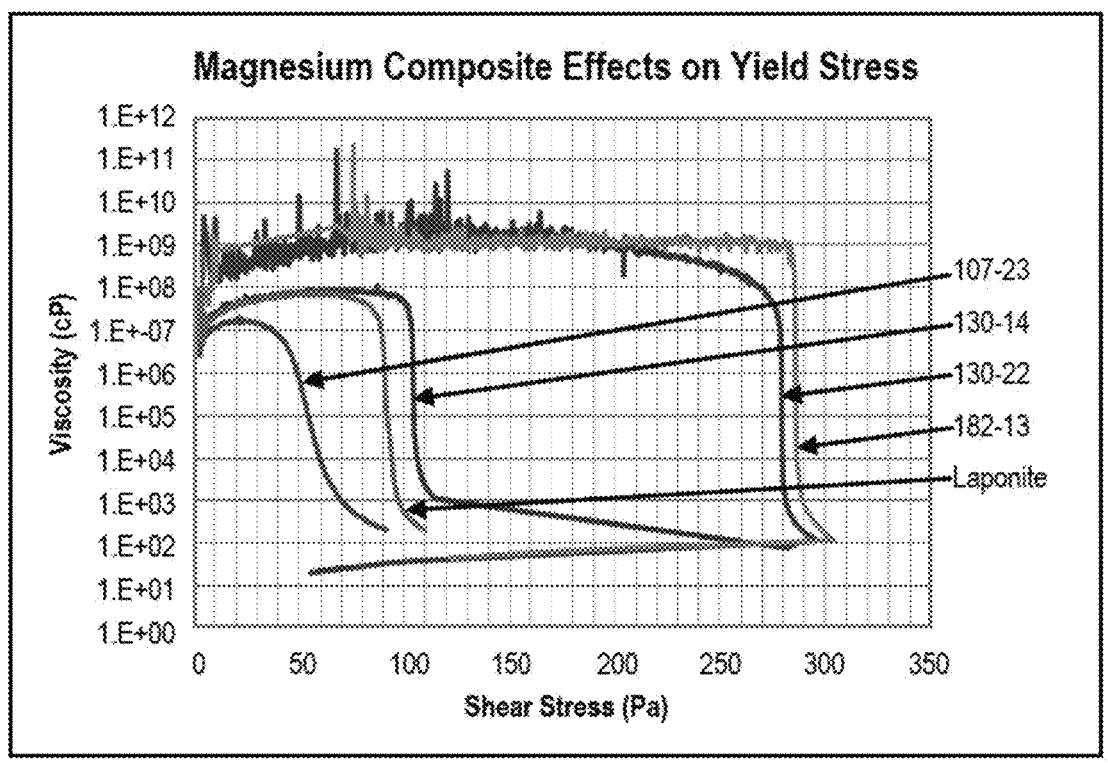
FIG. 6 is a graph illustrating the yield points of synthetic hectorite samples with different $MgO/MgCO_3$ molar ratios in the reaction feeds.

According the general formula of hectorite, i.e., Na$_{0.33}$[Mg$_{2.67}$Li$_{0.33}$][Si]$_4$O$_{10}$[OH]$_2$, magnesium is the essential part of the octahedral structure, along with a relatively small portion of lithium. This study discovered that, the proper mixture of MgO or Mg(OH)$_2$ with MgCO$_3$ leaded to higher swelling and yield point. As shown in Table 8, and illustrated in FIG. 6, when the magnesium source in the reaction feed has a 50:50 molar ratio of MgO/MgCO$_3$, the product gave the highest swelling and yield point. FIG. 6 is a graph illustrating the yield points of synthetic hectorite samples with different MgO/MgCO$_3$ molar ratios in the reaction feeds. Apparently, the addition of MgCO$_3$ to the feeds, so that the molar ratio of MgO/MgCO$_3$ is about 50/50, gave the highest yield point. The sample made with MgO/MgCO$_3$ of 0/100 is not plotted, due to the lack of viscosity.

The addition of MgCO$_3$ into the feeds may have several effects: 1). As compared to MgO or Mg(OH)$_2$, MgCO$_3$ is a carbonate salt, which reacts relatively slower to acids, which may thus help to compensate the gelling time needed and slow down or "buffer" the neutralization rate; 2). The presence of carbonate, CO$_3^{2-}$ in the reaction feed may help to build the template clay framework, along with the OH— groups; similar to its role in hydrotalcite, e.g., Mg$_6$Al$_2$CO$_3$(OH)$_{16}$.4(H$_2$O), in which the hydrotalcite structure consists of a basic layer that is positively charged by substitution of Al$^{3+}$ for Mg$^{2+}$, and a negatively charged interlayer containing carbonate and water molecules. The carbonate ions in the interlayer can be exchanged with other anions, such as F$^-$ and OH$^-$. In other words, the MgO or Mg(OH)$_2$ and MgCO$_3$ mixture may help to form the template layered framework, similar to common layered double hydroxides, which have clay-like structure similar to brucite [Mg(OH)$_2$] with the magnesium ions octahedrally surrounded by hydroxyl groups with the resulting octahedra sharing edges to form infinite sheets. 3). The released CO$_2$ and the bubbling effect during the neutralization reaction and the hydrothermal reaction may help to reduce the density of the slurry, thus giving more swelling volume for the gelling and allowing for better dispersion of the feeds. It was also found that when only MgO was used as the magnesium sources, the reaction results were not stable and substantial brucite (MgO) is left in the products; while when only MgCO₃ is used, the reaction appeared too slow and the product's performance rather poor.

Because of the above reasons, a mixture of 50:50 molar ratio of MgO/MgCO₃ was used throughout this study.

In addition to MgO and MgCO₃, MgCl₂ and MgSO₄ were also evaluated in this study. Magnesium chloride hexahydrate yields a swelling product comparable to the MgO/MgCO₃ matrix, however, as with using only MgCO₃, the yield point is lower than that of Laponite® RD. Also, the use of Cl⁻ anions in the reactions may lead to rusting/corrosion problems. On the other hand, the use of MgSO₄ leads to high content of sulfate, although with initially thick and high volume cake, after drying and powdering the material yielded no swell index or yield stress.

For the above reasons, magnesium sources of chloride and sulfate were not used.

TABLE 8

Viscosities and yield points of the synthetic hectorite products with different molar ratios of MgCO3/MgO in the feeds.

| Reaction Code | MgCO3/MgO Molar Ratio | Swell Index (mL) | Yield point (Pa) |
|---|---|---|---|
| 130-13 | 0/100 | <10 | ND |
| 130-15 | 25/75 | <10 | ND |
| 182-13 | 40/60 | 47 | 290 |
| 130-22 | 50/50 | 60 | 308 |
| 130-14 | 75/25 | 36 | 100 |
| 107-23 | 100/0 | 48 | 30 |

ND = not determined, due to low swelling and low viscosity.

Lithium and Fluorine

As the cations in the octahedral coordination of the hectorite structure, both $Mg^{2+}$ and $Li^+$ are the essential part of the trioctahedral structure. $Li^+$ ions fit in this unique structure not only because of the unit charge bared for the balance of the negative charge when $Al^{3+}$ is replaced by $Mg^{2+}$, but also because of the small ionic size and the high mobility. Fluorine, in the form of fluoride plays an important role for the synthesis of clays. The presence of $F^-$ in the reaction feeds apparently facilitate the formation of the clay like structures. This is probably due to the fact that $F^-$ anion has very similar anionic size to the clay structural hydroxyl group anions of $OH^-$. See H. D. B. Jenkins and K. P. Thakur, J. (1979) Chem. Educ., 56, 576, Page 78, incorporated herein by reference in its entirety. Also, $F^-$ has much higher electronegativity which aids in combining with the cations of magnesium and lithium. Due to the similarity of $OH^-$ and $F^-$ in electronegativity and ionic radius, 1.40 Å and 1.36 Å, respectively, the substitution of fluorine for hydroxyl groups is plausible in clay minerals. See Pauling, L. (1960) The Nature of the Chemical Bond." 3rd ed., Cornell University Press, New York, 514 pp.; and Koritnig, S. (1963) Zur Geochemie des Fluors in Sedimenten: Fortschr. GeoL Rheinl. Westfalen. 435, 1-6, each incorporated herein by reference in their entirety. Thus, in the synthesis of clay type minerals, fluorine can be an effective promoter for building the clay structure.

Figure 7:
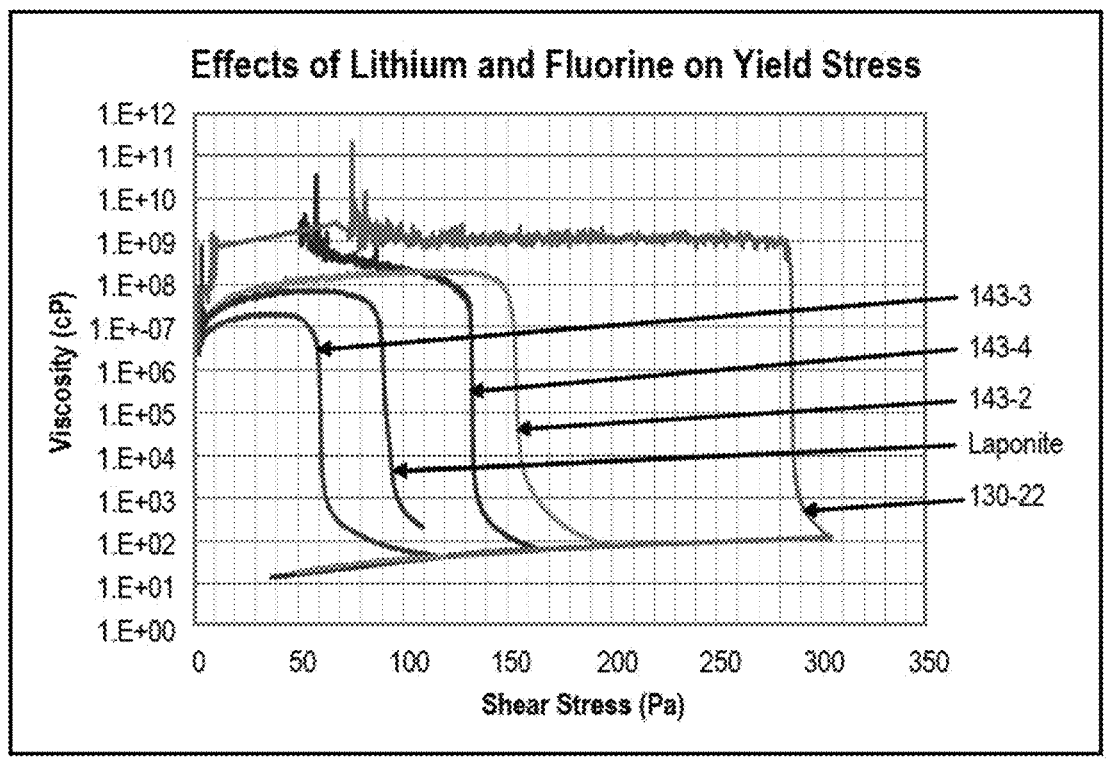
FIG. 7 is a graph illustrating the effects of lithium and fluorine on yield stress measurements.

The effects of lithium and fluorine on the swelling and yield points of the synthetic hectorite clays are shown in Table 9, and illustrated in FIG. 7. Note that lithium and fluorine have a synergistic effect on yield stress. Apparently, when both $Li^+$ and $F^-$ are used in the normal reaction feeds, both the swelling and the yield point of the synthetic hectorite reached the highest; when these two determinant elements were absent, the reaction products had neither swelling nor viscosity (FIG. 7).

For comparison, the performance of Laponite® RD were also measured and shown in FIG. 7. Evidently, although Laponite® RD used both lithium and fluorine in the soluble feeds, the performance, in terms of swelling and yield point were rather lower as compared to the products achieved in this study. We considered that the buffered MgO/MgCO₃ system used in the present study played the key role in promoting the formation of the synthetic hectorite with the outstanding rheological performance. With this MgO/MgCO₃ system, reasonably high swellings and yield points were achieved even when fluorine is absent.

TABLE 9

Effects of lithium and fluorine in synthetic hectorite

| Reaction Code | Conditions | Swelling (mL) | Yield point (Pa) |
|---|---|---|---|
| 130-22 | Normal Feeds With Li and F | 60 | 308 |
| 143-3 | No Li and F | 12 | 60.5 |
| 143-4 | With Li only | 60 | 132.8 |
| 143-2 | With F only | 17.5 | 160 |
| Laponite ® RD | With Li and F* | 32 | 95 |

*According to Neumann (1971), U.S. Pat. No. 3,586,478.

It should be noted that the amount of lithium required for achieving high yield stress were different when different silica source was used. For example, when diatomaceous earth was used as the silica source, substantially higher lithium would be needed, about 2.5 times higher than when silica gel was used. This may be due to the fact that diatomaceous earth materials have relatively small surface area, high impurities, and the biogenic silica in opal forms.

4. Silica Sources

Figure 8:
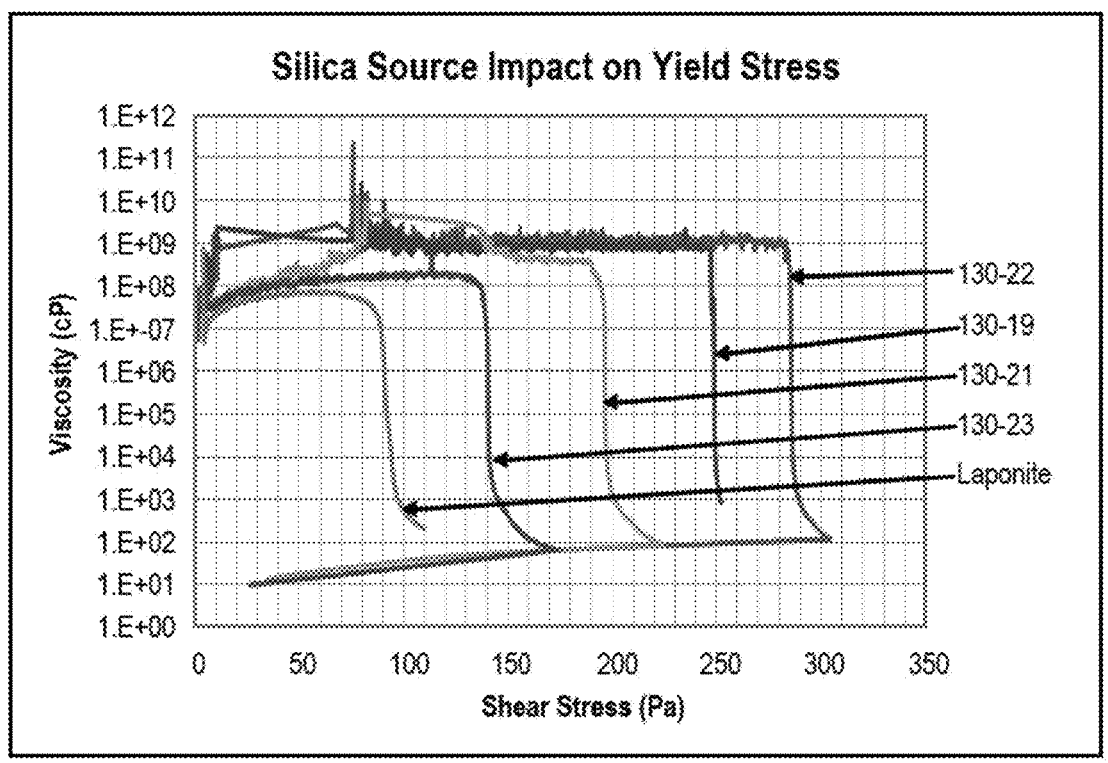
FIG. 8 is a graph illustrating the viscosity changes with yield stress of synthetic hectorite made from different silica sources.

The present study also evaluated the impacts of using different powdered silica sources in the synthesis of hectorite. In general, a highly alkaline reagent is needed to aid in solubilizing the powdered silica feed. This includes sodium hydroxide and/or sodium silicate. When sodium silicate (such as N® Clear of PQ Corporation) is used, the silica contribution from it needs to be accounted. Table 10 shows the swellings and yield points of the synthetic hectorites made with the same reaction conditions and same proportions of N® Clear sodium silicate, i.e., ~50% of the total silica, except that different powdered silica sources were used. The viscosity and yield stress of these samples are plotted in FIG. 8. Note that Laponite® RD has a low yield point.

The synthetic silica feed in Table 11 refers to Britesorb® D300, which is a silica xerogel powder with a median particle size of 12 µm and a BET surface area of 475 m²/g. Floss K is a natural diatomaceous earth product from Lompoc, California, it has a median particle size of 3.8 µm and a BET surface area of 23.6 m²/g. Ecoflat is an opalitic diatomaceous earth product from Chile, which has a median particle size of 4.2 and a BET surface area of 15.6 m²/g. The silica fume is a waste product from Imerys Metalcasting GmbH, Germany, which has a D50 of 1.2 µm and a BET surface area of 10.9 m²/g. Included in Table 11 is also a calcined talc, the hectorite product synthesized from this and similar feeds will be discussed in later section. The selected physical and chemical properties of the powdered silica sources are shown in Table 11.

The magnitude of the swellings and yield points of these synthetic hectorite samples are apparently proportional to the BET surface areas of the powdered silica sources used. The synthetic silica source, i.e., Britesorb D300, has the highest surface area, and which is corresponding to the highest swelling and yield point or stress (Table 10). On the other hand, the silica fume, although has very fine particles, but its BET surface area is rather low, only 10.9 m²/g, and the swelling and yield point are rather lower than synthetic hectorites made from other silica sources. This indicates that the reaction rates, either in the sol gel feed preparation stage or in the hydrothermal reaction stage, strongly impact the formation of the synthetic clay. It was also observed that even after letting the silica fume reacted with a 1.0 M sodium hydroxide for 24 hours, then followed by the standard preparation, the final product showed non-swelling with no yield point. Evidently, high surface area silica source leads to more complete reactions.

TABLE 10

Effects of using different powdered silica feeds in synthetic hectorite

| Reaction Code | Silica Source | Swelling (mL) | Yield Point (Pa) |
|---|---|---|---|
| 130-22 | Synthetic Silica | 60 | 308 |
| 130-19 | Floss K | 45 | 175 |
| 130-21 | Ecoflat | 43 | 196 |
| 130-23 | Silica Fume | 27 | 140 |

TABLE 11

Physical and chemical properties of the powdered materials used as silica feeds.

| | Britesorb D300 | Floss K | Ecoflat | Silica Fume | Calcined Talc |
|---|---|---|---|---|---|
| Particle Size $d_{50}$ (μm) | 12 | 5.9 | 4.2 | 1.2 | 6.7 |
| Surface Area (m₂/g) | 475 | 23.6 | 15.6 | 10.9 | 4.89 |
| SiO₂ (%) | >94 | 94.3 | 95.2 | 95.3 | 63.8 |
| Fe₂O₃ (%) | n.d. | 1.0 | 0.4 | 0.61 | 2.4 |
| MgO (%) | n.d. | 0.5 | 0.3 | 0.20 | 32.73 | n.d. = not detected.

5. Other Silica Sources with Magnesium

The present study also evaluated the use of other silica and/or magnesium sources that could be utilized, including calcined talc, calcined talc tailings and waste perlite fines. The performance properties of the synthetic hectorite made from these alternative feeds are shown in Table 12.

TABLE 12

Effects of using other alternative feeds in the synthesis of hectorites

| Reaction Code | Source | Swelling (mL) | Yield Point (Pa) |
|---|---|---|---|
| 130-1* | Calcined Talc | 20 | 18 |
| 16-4** | Talc Tailing1 | <10 | <30 |
| 16-3** | Talc Tailing2 | <10 | <30 |
| 130-3* | Perlite Fines | <10 | ND |

*Reaction only utilized MgO and not MgCO₃;
**Reaction would only proceed if the tailings were acidified with H₂SO₄ prior to adding to mother slurry.
ND = Not determined, due to low viscosity.

The calcined talc is directly made from Imerys Jetfine 3CW talc by calcination at 1000° C. for 2 hours and puck-milled after calcination. After this treatment, the talc was essentially dehydrated and the XRD study showed that the crystalline phase of the calcined talc turned to enstatite (MgSiO₃), in which the magnesium and silica components (i.e., MgO·SiO₂) may be used as the feeds for synthetic hectorite. For the same reason, the talc tailing materials (i.e., Tailing 1 and Tailing 2) were also calcined at 1050° C. for 2 hours and used for the synthesis. The talc tailings were from Penhorwood, Ontario, Canada, which contains about 60-80% magnesite and 40-20% talc, along with other impurities. The major chemical compositions of the calcined talc, talc tailing, as well as perlite are shown in Table 13.

The relatively poor rheological performance of the synthetic products from these alternative silica and/or magnesium feeds were probably related to the poor reactivity of these materials with the sodium silicate or sodium hydroxide in the sol-gel preparation and in the hydrothermal reaction stages. The silica in these materials has been combined with other elements, such as Mg, Al, Fe, etc., and dissolution or break down of these silicate or aluminosilicate compounds with a base was not as easy as dissolution of the high silica materials with a base, such as silica gels and diatomaceous earth. On the other hand, the high contents of the other ions, such as $Al^{3+}$, $Fe^{2+/3+}$, etc., may cause strong interference with the formation of clay structures.

Historically, there were prior arts claimed the use of talc and converted to so-called mesotalc for the synthesis of the hectorite clays. The methods involved the use of alkali fluxes and high temperature calcination before hydrothermal reactions. See Orlemann J. K. and Barbara Susan Neumann et al., each incorporated herein by reference in their entirety. These earlier work assumed that pure talc could be made and used. In reality, especially for industrial production, the presence of other impurities in talc will strongly impact the reaction products, not mentioning the high costs associated with energy and complicated processes.

TABLE 13

Bulk chemical compositions of other alternative mineral feeds

| Components, % | Calcined Talc | Calcined Talc Tailing1 | Calcined Talc Tailing2 | Perlite fines |
|---|---|---|---|---|
| MgO | 32.6 | 52.9 | 59.3 | 0.27 |
| SiO₂ | 62.9 | 32.7 | 21.7 | 76.7 |
| Fe₂O₃ | 2.43 | 11.5 | 13.7 | 0.75 |
| CaO | 0.10 | 0.82 | 1.09 | 0.74 |
| Cr₂O₃ | 0.14 | 0.67 | 0.78 | 0.00 |
| Al₂O₃ | 0.17 | 0.65 | 0.90 | 12.25 |
| NiO | 0.61 | 0.38 | 0.27 | 0.00 |
| MnO | 0.01 | 0.22 | 0.28 | 0.00 |
| P₂O₅ | 0.02 | 0.03 | 0.03 | 0.03 |
| Co₃O₄ | 0.02 | 0.03 | 0.03 | 0.00 |
| Total | 99.0 | 99.9 | 98.1 | 90.7 |

6. Effects of Sol-Gel Preparation and Acidification

The synthesis flow chart, as illustrated in FIG. 1, includes two essential parts, i.e., the sol gel feed preparation step and the hydrothermal reaction step. The hydrothermal reaction conditions are straight forward: increase the reactor temperature to 250° C. and pressure to 500 psi in 30 min, and keep the reaction at this temperature and condition for 2 hours.

However, the preparation step of the sol gel feed for the hydrothermal reaction is determinant. This step involves the dissolution of the powdered silica feed by strongly alkaline bases, such as sodium silicate and/or sodium hydroxide, and the formation of supersaturated silicic acid and polysilicic acid molecules. After the dissolution step of mixing silica powders with a strong base, the acidification step is followed by controlling the pH to about 10, so that the dissolved silica are still largely remain in solution. The general reaction can be represented by equation (4).

$$SiO_2+Na_2SiO_3+H_2SO_4+3H_2O \Rightarrow 2Si(OH)_4+Na_2SO_4 \quad (4)$$

Because the powdered silica-containing feeds have different particle sizes and surface areas, and the slurry has a relatively high solid content (typically, ~15-20%), the dissolution of the powdered feeds are usually not complete, and many particles have only the surface reacted or hydrated to silicic acids. As a result, the sol slurry solution looks like a paste of translucent gel. This paste of gel-like feed does not have significant yield point. It acquires the high viscosity and yield point only after the hydrothermal reaction after being converted to clay-like structure.

It was noted that when different types of acids were used in the acidification step of the same silica sol feed, the final synthetic hectorites showed different rheological performances. As shown in Table 14, when phosphoric acid is used, both the swelling and the yield point are lower than those when acetic acid and sulfuric acid were used. XRF analysis indicated that high percentage of P2O5 was present in the product (15.1% P2O5). The use of acetic acid in acidification gave relatively high swelling, but the yield point is about 50 units lower than when sulfuric acid was used.

TABLE 14

Effects of different acids used in acidification on rheological performance.

| Reaction Code | Acid Used | Swelling (mL) | Yield Point (Pa) |
|---|---|---|---|
| 148-2 | Phosphoric Acid, 85% | 41 | 72 |
| 148-1 | Acetic Acid, 99% | 72 | 248 |
| 130-18 | Sulfuric Acid, 96% | 60 | 308 |
| NA | Laponite ® RD | 32 | 95 |

It was also noted that an excess of a polyatomic anion had adverse effects in the clay synthesis. The addition whether in the case of an acid or other feeds such as Magnesium Sulfate Heptahydrate leads a thick cake. However, once processed, the resulting powder has minimal swelling (<10 ml) and no yield point. The exact determining concentration of polyatomic anion has not been determined.

7. Reaction Time

The reaction time for the hydrothermal reaction was set as 2 hours after the reactor reached 250° C. and ~500 psi. The present study found that shorter reaction time of less than 2 hours failed to guarantee the optimal performance, while longer reaction time only gave marginal improvement(Table 15). Thus, the hydrothermal reaction conditions of 250° C. and ~500 psi for 2 hours represent the optimal conditions. This temperature and pressure conditions are the typical reaction conditions practiced at Imerys' Lompoc Silicate Plant.

TABLE 15

Effects of different reaction time on rheological performance.

| Reaction Code | Reaction Time (Hours) | Swelling (mL) |
|---|---|---|
| 99-2 | 1 | <10 |
| 99-1 | 2 | 40 |
| 70-2 | 4 | 35 |
| 75-6 | 16 | 42 |

8. Performance Comparison to Laponite® RD and Other Clays

In this study, the rheological performance of the synthetic clays made in each batch reaction was always compared to that of the commercial Laponite® RD. As shown in FIG. 9, the yield points of the synthetic clays made in 7 different batches showed consistently higher yield points than those of Laponite® RD. The average yield point of the synthetic clays of this study is 319 Pa, while the yield point of the Laponite® RD is 95 Pa. The present study achieved >3× high yield stress than the commercial product. The consistent performance data of the clays made in different dates proved the reproducibility of the reaction processes, which is of high importance for scale-up reactions.

Figure 10:
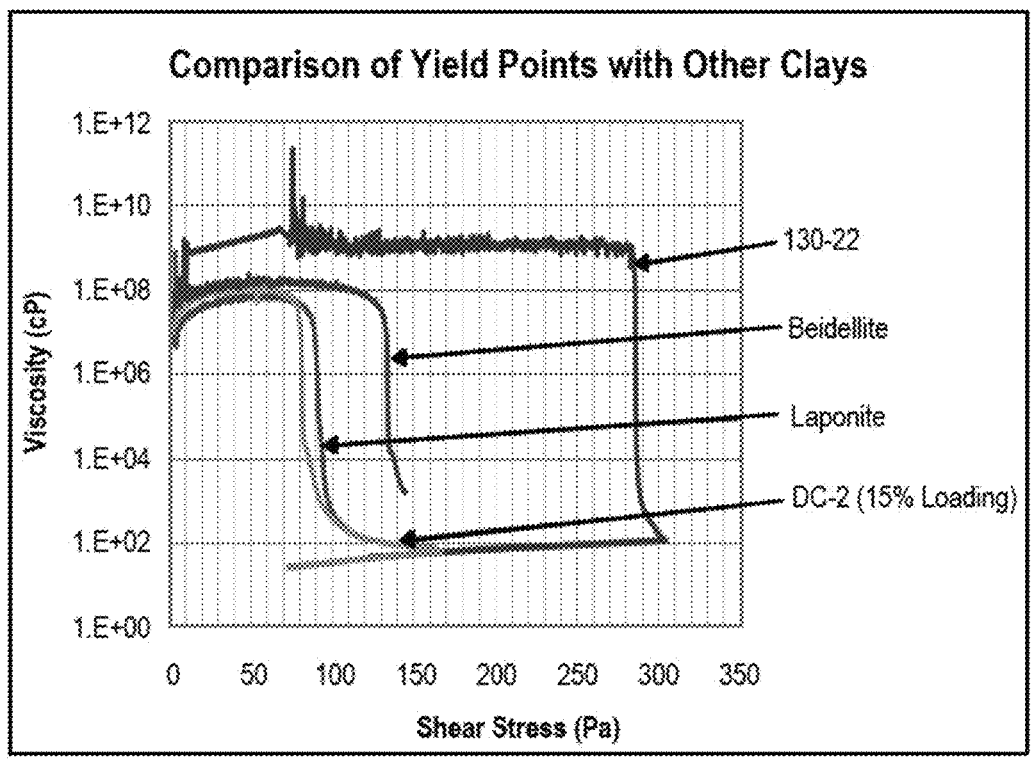
FIG. 10 is a graph illustrating the yield points of the synthetic clays made in different dates, as compared to the bench mark of Laponite® RD, indicate the reproducibility of the reaction processes.

In addition to Laponite® RD, the rheological performance of the synthetic clays made in the present study was also compared to other clay samples, including a beidellite clay from Greece and a sodium bentonite, i.e., DC-2, from Wyoming, USA. The beidellite clay is a rare natural clay and which showed a relatively high yield point with 2% loading in water. The DC-2 sodium bentonite showed too low a viscosity if only 2% slurry was prepared as in other clays. Hence, a loading of 15% of the DC-2 clays in water was used in order to reach similar viscosity level. Clearly, the synthetic clays made in this study from the silica gel showed the highest yield point (FIG. 10)

Example 5

Performance Comparison to Laponite® Under Different Conditions

1. Temperature Effects

The yield stresses of the synthetic clays under elevated temperatures were also evaluated against Laponite® RD and Carboxy Methyl Cellulose, a widely used rheological modifier. FIG. 11 is a graph illustrating the yield stress of the synthetic clays at elevated temperatures. The synthetic clays were made with slightly different MgO/MgCO3 ratios, and one clay was washed, having a low conductivity.

Apparently, the synthetic clays made in this study maintained higher yield stresses at elevated temperatures than both Laponite® RD and Carboxyl Methyl Cellulose. In fact, the yield stress of the synthetic clays made in the present study was increased with the increase of measurement temperatures. Temperatures higher than 90° C. were not attempted due to the rapid evaporation of water from the paste samples.

2. Ionic Strength Effects

Figure 12:
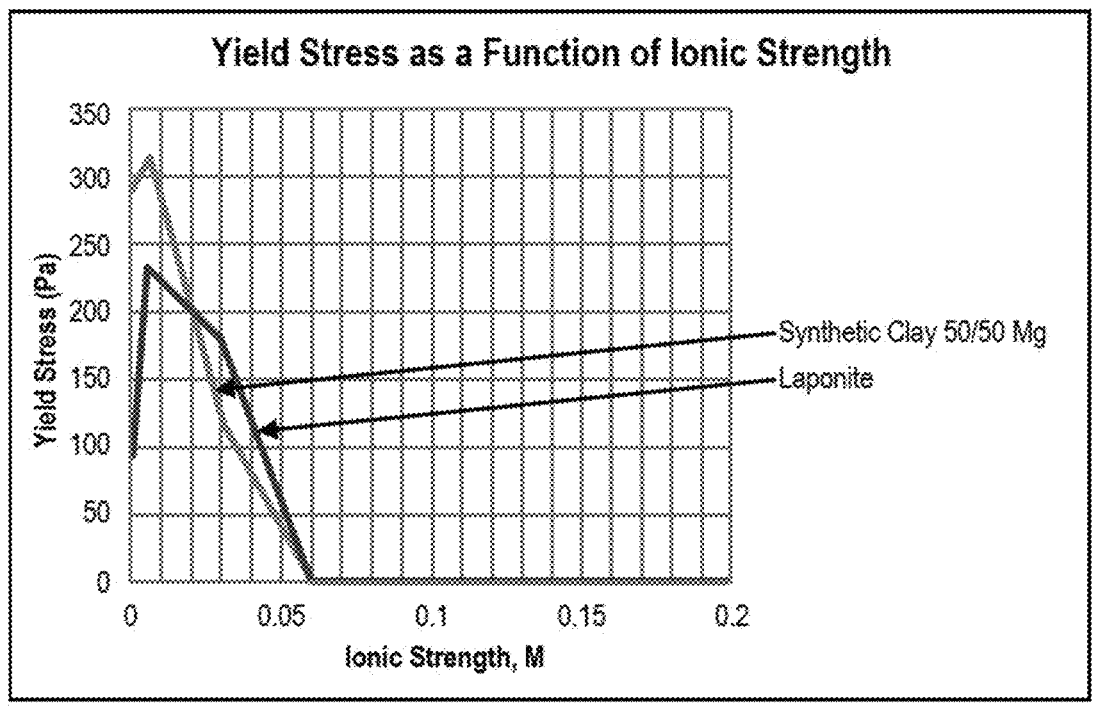
FIG. 12 is a graph illustrating the yield stress of the synthetic clays when mixing with different ionic strength liquids.

The ionic conductivity of the synthetic clays made in the present study is about 750 uS/cm when measured with 2% loading in water. The ionic conductivity of Laponite® RD of the same loading is about 440 μS/cm. Both materials showed high sensitivity to the ionic strength of the mixing liquid with calcium chloride as the ionic strength adjuster. In other words, when the clay materials are mixed in water of high ionic strength, their viscosity reduced remarkably. This is due to the fact that, when the mixing liquid has a high ionic concentration, the charges carried on the clay particle surfaces can easily be balanced by the counter ions from the solution, thus the particles' card house structure will be ruined and the adhesive nature between particles is interrupted, therefore, the viscosity is lost under shear stress (FIG. 12).

3. The pH Effects

Figure 13:
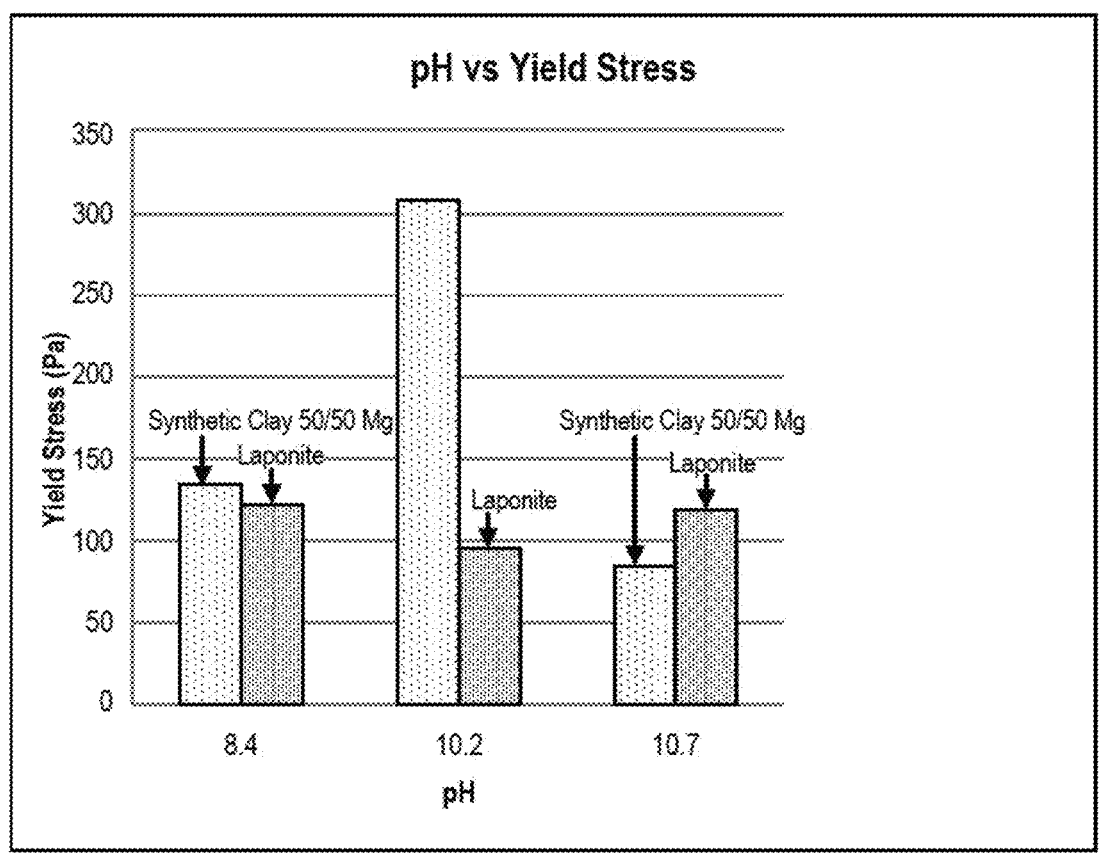
FIG. 13 is a graph illustrating the yield stress of the synthetic clays when adjusted to different values of pH.

The responses of the synthetic clays to the variation of ionic strength are also reflected in the solution with different pHs. FIG. 13 showed the yield stress measured with adjusted pH for both the synthetic clays and the Laponite® RD.

4. The Cation Exchange Capacity

The cation exchange capacities (CEC) of both the synthetic clay and the Laponite® RD were also measured. The synthetic clays made in this study had relatively higher CEC of 118 mequ/100 g, as compared to 85 of Laponite® RD. The results are illustrated in FIG. 14.

5. Aging Effects

It was also noted that, the synthetic clays made in the present study has an aging effect, that is, after the clay paste was made with water, with the increase of time the yield stress of the paste will increase significantly. Laponite® RD was found not showing much of an aging effect. This is probably because when powdered silica was used in making the clays, and the coarse particles of the synthetic clays products have much slower wetting speed after mixed with water, and increased wetting time allowed the particle lumps become more wetted and dispersed, thus the interactions between particles increased. Laponite® RD was made from soluble feeds, and the product has a very fine particle size of about 25 nm. Because of the rate difference in wetting and dispersion in water, the aging effect of Laponite® is not noticeable. FIGS. 15 and 16 show the aging effects of Laponite® RD and the synthetic clays. In the first three days of aging, Laponite® showed a small increase in yield stress from about 90 Pa to 110 Pa, and a slightly decrease to about 80 Pa.

Apparently, Laponite® RD showed only a small increase in yield points with the aging, because of the fine particle size and fast wetting and dispersion in water; while the synthetic clays made from powdered silica sources showed much larger increase in yield points, due to the steadily increased wetting and dispersion of the coarse lumps.

As shown in FIG. 16, the synthetic clay showed a relatively large increase on the yield point from about 200 Pa at Day 1 to about 500 Pa of Day 4, i.e., approximately, an increase of about 100 Pa/day in these four days.

The aging effects of both samples are also illustrated in FIG. 17. When the shear stress were measured for aged samples from both Laponite® and the synthetic clay at a shear rate of 20 s$^{-1}$, the shear stresses of the synthetic clays showed a more significant increase than Laponite®.

6. Viscosity Versus Shear Rate

Figure 18:
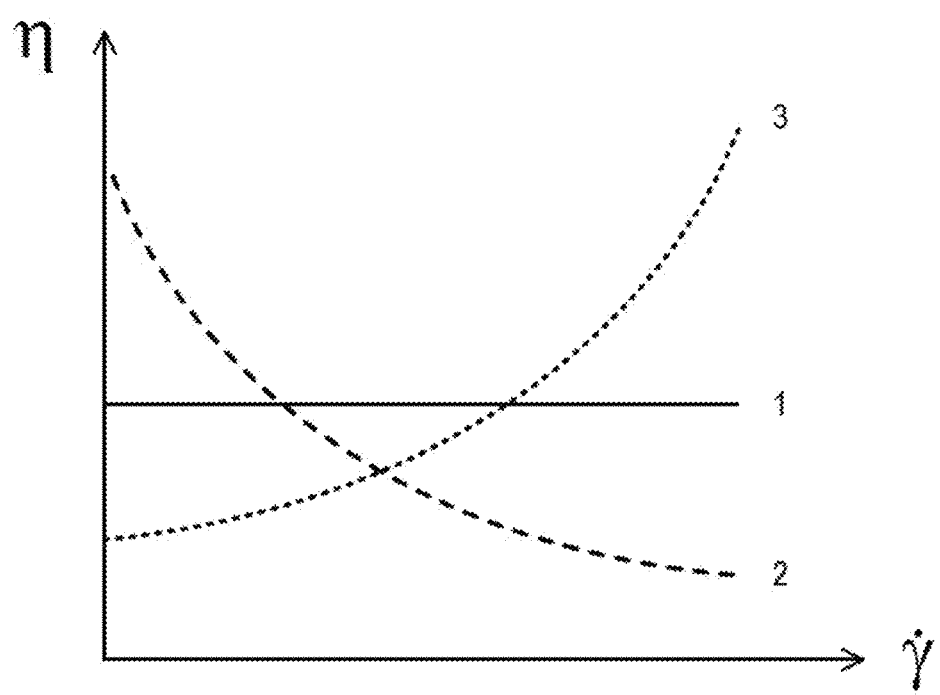
FIG. 18 is a graph illustrating viscosity (η) versus shear rate (r) for flow behaviors of: Newtonian fluids (1), shear-thinning fluids (2), and shear-thickening fluids (3).

Depending on their viscosity behavior as a function of shear rate, stress, deformation history, etc., fluids are characterized as Newtonian or non-Newtonian. Newtonian fluid is a fluid its viscosity remains unchanged with the change of shearing rate, such as water or salad oils; the non-Newtonian liquids can be far more complicated, but they generally show changes with varying shear rates. As shown in FIG. 18, the Newtonian fluid shows a constant viscosity with the increase of shear rate (FIG. 18, curve 1); Non-Newtonian fluids behave differently. For some, such as shear-thinning fluids, their viscosities decreases when the shear rate increases (FIG. 18, curve 2) e.g. yogurt; while for the shear-thickening fluid, the viscosity increases with increasing shear rate (FIG. 18, curve 3) e.g. starch solutions.

Figure 19:
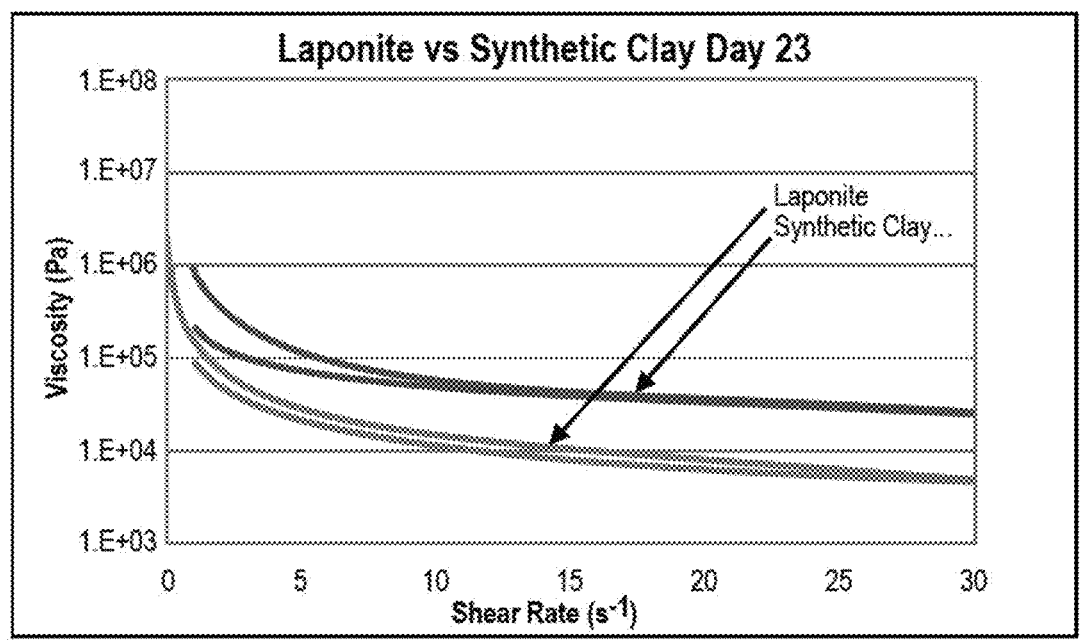
FIG. 19 is a graph illustrating the viscosity versus shear rate plots of Laponite® RD and the typical synthetic hectorite made in this study.

Apparently, as shown in FIG. 19, the viscosity versus shear rate plots of Laponite® RD and the typical synthetic hectorite made in this study show decreased viscosity with the increase of shear rate. Thus, both samples showed a shear-thinning behavior. The curves of the two samples are nearly parallel with the synthetic clay having about one magnitude higher viscosity. Both samples belong to non-Newtonian pseudoplastic fluids which show a time-dependent change in viscosity, and the longer the fluid undergoes shear stress, the lower its viscosity.

7. Shear Stress Versus Shear Rate

The present study also compared the performance of Laponite® RD and the synthetic clays in terms of their behavior after reaching their yield points. Both samples showed similar thixotropic behaviour. Thixotropy is a time-dependent shear-thinning property. Under static conditions, certain fluids may be thick and viscous, but when shaken, agitated, sheared or otherwise stressed, the fluids will flow (become thin, less viscous) over time (time dependent viscosity). They then take a fixed time to return to a more viscous state. A thixotropic fluid is a fluid which takes a finite time to attain equilibrium viscosity when introduced to a steep change in shear rate. Some thixotropic fluids return to a gel state almost instantly, such as ketchup, and are called pseudoplastic fluids. Others such as yogurt take much longer and can become nearly solid. Many gels and colloids are thixotropic materials, exhibiting a stable form at rest but becoming fluid when agitated. Thixotropy arises because particles or structured solutes require time to organize. An excellent overview of thixotropy has been provided by Mewis and Wagner. See Mewis, J; Wagner, N J (2009). "Thixotropy". Advances in Colloid and Interface Science. 147-148: 214-227, incorporated herein by reference in its entirety.

FIG. 20 illustrates the general classification so fluids based on their behaviour when the shear stress is plotted against the shear rate. Pseudoplastic, Bingham, and Bingham pseudoplastic all show reduction in apparent viscosity with increasing shear rate.

Figure 21:
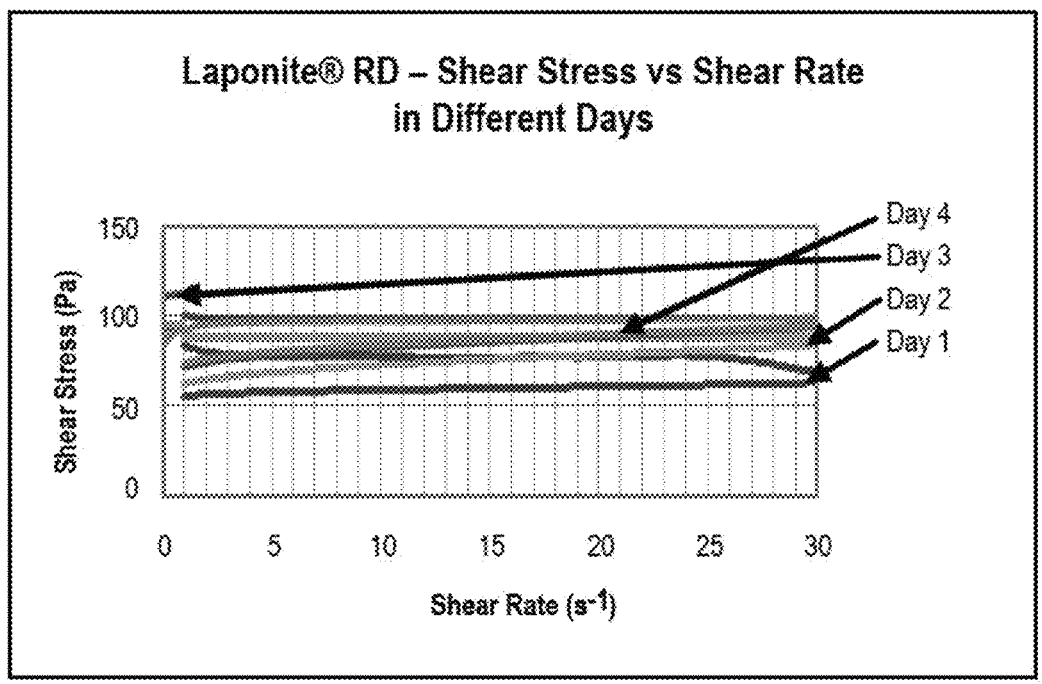
FIG. 21 is a graph illustrating shear stress of Laponite® RD in the shear rate range of 0 to 30 $s^{-1}$.
Figure 22:
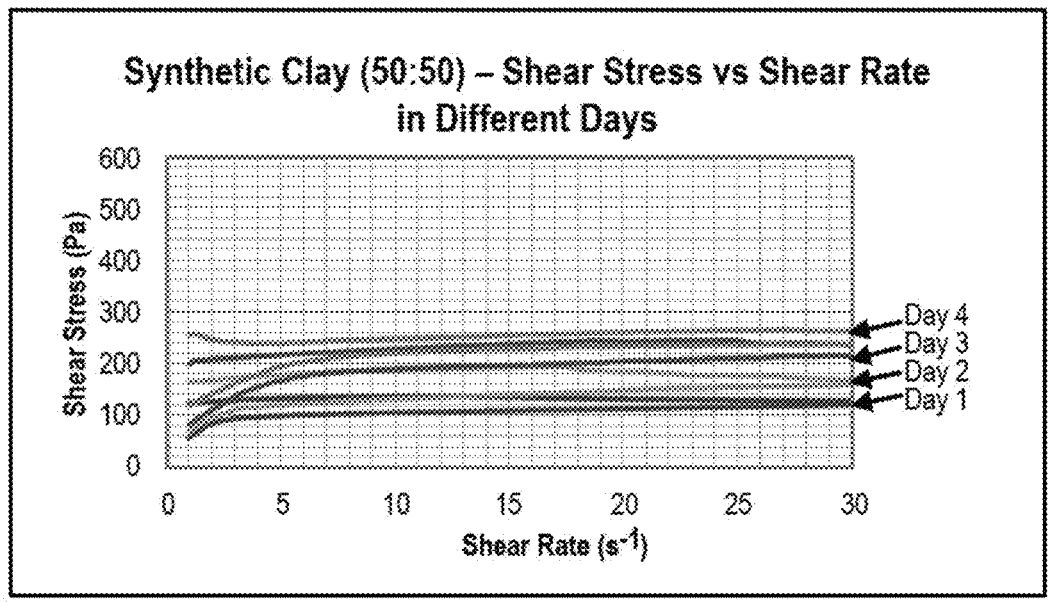
FIG. 22 is a graph illustrating shear stress of composited synthetic clays in the shear rate range of 0 to 30 $s^{-1}$. The loop showed the shear stress changes with the increased in shear rate, then reduced in shear rate. The data collected in different aging time (days).

Apparently, as shown in FIGS. 21 and 22, both the Laponite® RD and the synthetic clays showed the Bingham pseudoplastic or pseudoplastic behavior of relatively small changes in shear stress with the changes of shear rate. FIG. 21 is a graph illustrating shear stress of Laponite® RD in the shear rate range of 0 to 30 s$^{-1}$. The loop showed the shear stress changes with the increase in shear rate (up curve in a loop), then a reduction in shear rate (lower curve in a loop). The data is collected after different aging times (days). FIG. 22 is a graph illustrating shear stress of composited synthetic clays in the shear rate range of 0 to 30 s$^{-1}$. The loop showed that the shear stress changes with the increased shear rate, then reduces in shear rate. The data is collected after different aging times (days).

It should be noted that, as shown in FIGS. 21 and 22, when the shear stress vs. shear rate were plotted in a hysteresis loop, i.e., from a shear rate of 1 s$^{-1}$ to 30 s$^{-1}$ (the upper curve of the loop) and then reduced from 30$^{-1}$ to 1 s$^{-1}$ (the lower curve of the loop) the shear stress are different: the shear stresses were relatively higher when measured with increased rate; while slightly lower when reduced the shear rate in the same loop of measurements. This was clearly due to the thixotropy behaviour of the fluids.

The aging effects also reflected in FIGS. 21 and 22, respectively. Over 4 days of aging time, Laponite® RD has a ~30% increase in shear stress when aged. In the same period of time, the synthetic clay has increased its shear stress ~100%. The reasons have been explained in an earlier section.

The present study successfully synthesized hectorite type of clay materials with extraordinarily high viscosity and yield point from powdered silica materials, which shows 3 folds higher yield point that the commercial Laponite® RD. The new synthesis reaction method includes the use of a buffered MgO/MgCO$_3$ system, a sol-gel feed preparation step, and a hydrothermal reaction at 250° C. and 500 psi for 2 hour.

This is unlike the Laponite® series products, which are made from soluble chemicals and reacted for 24 hours or longer. The present methods can be tailored to use different powdered silica and magnesium sources, and the reaction may be completed in 2 hours. Therefore, the synthetic hectorite type of inorganic rheological modifiers made according to the present methods can be used to make a wide range of products fitted to different applications with reduced costs. Large reactor trials proved that the reaction processes may be scaled up.

The following tables provide a summary of reactant feeds used, quantity, process conditions and swelling and yield stress evaluations:

TABLE A-1

Records of selected reactions with magnesium oxide and magnesium sources

| RxN Code | N-Clear (g) | BriteSorb D300 (g) | MgCO$_3$ (g) | MgO (g) | NaF (g) | LiOH · H$_2$O (g) | H$_2$SO$_4$ conc, 96% (mL) |
|---|---|---|---|---|---|---|---|
| 107-13 | 21.41 | 6.59 | 38.58* | 0 | 2.99 | 5.26 | 0 |
| 107-23 | 21.63 | 6.74 | 13.65 | 0 | 1.49 | 2.52 | 3 |
| 130-13 | 21.72 | 6.39 | 0 | 6.53 | 1.57 | 2.66 | 7 |
| 130-14 | 21.39 | 6.48 | 10.29 | 1.66 | 1.57 | 2.68 | 3 |
| 130-15 | 21.49 | 6.23 | 3.22 | 3.91 | 1.53 | 2.59 | 3 |
| 130-16 | 21.29 | 6.5 | 6.35** | 3.3 | 1.5 | 2.48 | 3 |
| 130-17 | 43.88 | 12.43 | 18.42** | 3.11 | 3 | 5.25 | 6 |
| 130-18 | 43.51 | 12.4 | 13.72 | 6.67 | 3.09 | 5.44 | 6 |
| 182-3 | 43.49 | 12.43 | 10.97 | 8 | 3.2 | 1.93 | 3.25 |
| 182-9 | 43.72 | 12.38 | 12.36 | 7.23 | 3.02 | 5.27 | 6.75 |
| 182-10 | 43.49 | 12.36 | 10.98 | 8.07 | 3.03 | 5.25 | 6.75 |
| 182-11 | 43.37 | 12.38 | 10.96 | 7.98 | 3.22 | 2 | 3.5 |
| 182-12 | 43.44 | 12.42 | 10.97 | 7.99 | 2.99 | 2.01 | 4 |
| 182-13 | 43.41 | 12.39 | 10.97 | 8.01 | 2.99 | 2 | 4.1 |
| 182-16 | 43.52 | 12.51 | 13.68 | 6.66 | 3.18 | 2.07 | 3.85 |

*Magnesium Sulfate Heptahydrate (MgSO$_4$ · H$_2$O)-excellent cake, zero performance
**Magnesium Carbonate Hydroxide Hydrate (C$_4$Mg$_4$O$_{12}$ · H$_2$MgO · x H$_2$O)
ND = not determined, due to low viscosity

TABLE A-2

Process Conditions of Magnesium Feeds

| RxN Code | pH pre-rxn | T (° C.) | Pressure (psi) | Yield stress (Pa) | Swelling? |
|---|---|---|---|---|---|
| 107-13 | 9.37 | 247 | 480 | ND | n |
| 107-23 | 9.65 | 244 | 470 | 54 | y |
| 130-13 | 9.46 | 244 | 510 | ND | n |
| 130-14 | 9.59 | 244 | 520 | 100 | y |
| 130-15 | 9.42 | 247 | 480 | ND | n |
| 130-16 | 9.42 | 246 | 480 | 275 | y |
| 130-17 | 9.49 | 248 | 480 | 119 | y |
| 130-18 | 9.49 | 247 | 480 | 308 | y |
| 182-3 | 9.35 | 249 | 500 | 400 | y |
| 182-9 | 9.53 | 248 | 500 | 180 | y |
| 182-10 | too thick to measure | 247 | 490 | 280 | y |
| 182-11 | too thick to measure | 248 | 420 | 375 | y |
| 182-12 | too thick to measure | 249 | 500 | 290 | Y |
| 182-13 | too thick to measure | 249 | 500 | 280 | y |
| 182-16 | 9.57 | 251 | 500 | 290 | y |

TABLE B-1

Records of selected reactions noting purpose of lithium and fluorine

| RxN Code | N-Clear (g) | BriteSorb D300 (g) | MgCO$_3$ | MgO (g) | NaF (g) | LiOH · H$_2$O (g) | H$_2$SO$_4$ conc, 96% (mL) |
|---|---|---|---|---|---|---|---|
| 143-1 | 21.58 | 6.28 | 6.89 | 3.45 | 1.83 | 0 | 1.5 |
| 143-2 | 21.44 | 6.28 | 6.83 | 3.46 | 1.5 | 0 | 1.25 |
| 143-3 | 21.72 | 6.32 | 6.82 | 3.5 | 0 | 0 | 1.25 |
| 143-4 | 21.55 | 6.33 | 6.8 | 3.57 | 0 | 2.51 | 2.75 |
| 170-1 | 21.58 | 6.14 | 6.86 | 3.34 | 1.48 | 1.3 | 2.25 |
| 170-2 | 21.61 | 6.14 | 6.87 | 3.34 | 1.75 | 1.75 | 2.5 |
| 170-3 | 21.61 | 6.16 | 6.86 | 3.32 | 3 | 2.65 | 3.25 |
| 170-4 | 21.6 | 6.17 | 6.87 | 3.34 | 1 | 2.67 | 3.25 |
| 170-5 | 21.64 | 6.15 | 6.87 | 3.31 | 3 | 0.96 | 2 |

TABLE B-1-continued

Records of selected reactions noting purpose of lithium and fluorine

| RxN Code | N-Clear (g) | BriteSorb D300 (g) | MgCO$_3$ | MgO (g) | NaF (g) | LiOH · H$_2$O (g) | H$_2$SO$_4$ conc, 96% (mL) |
|---|---|---|---|---|---|---|---|
| 182-1 | 43.53 | 12.36 | 14.72 | 6.67 | 3.1 | 1.42 | 3.5 |
| 182-2 | 45.56 | 12.43 | 13.37 | 6.67 | 3.02 | 1.92 | 3.75 |

TABLE B-2

Process Conditions of studying lithium and fluorine effects

| RxN Code | pH pre-rxn | T (° C.) | Pressure (psi) | Yield stress (Pa) | Swelling? |
|---|---|---|---|---|---|
| 143-1 | 9.42 | 247 | 500 | 154 | n |
| 143-2 | 9.52 | 245 | 460 | 166 | n |
| 143-3 | 9.5 | 247 | 480 | 60.5 | n |
| 143-4 | 9.43 | 247 | 480 | 133 | y |
| 170-1 | 9.48 | 242 | 500 | 271 | y |
| 170-2 | 9.42 | 246 | 460 | 181 | y |
| 170-3 | 9.32 | 242 | 500 | 204 | y |
| 170-4 | 9.3 | 247 | 460 | 257 | y |
| 170-5 | 9.3 | 245 | 480 | 270 | y |
| 182-1 | 9.49 | 253 | 500 | 199 | y |
| 182-2 | 9.49 | 252 | 500 | 310 | y |

TABLE C-1

Records of selected reactions with various silica sources

| RxN Code | N-Clear (g) | BriteSorb D300 (g) | MgCO$_3$ | MgO (g) | NaF (g) | LiOH · H$_2$O (g) | NaOH (g) | H$_2$SO$_4$ conc, 96% (mL) |
|---|---|---|---|---|---|---|---|---|
| 130-19 | | 12.62 (Flk) | 6.83 | 3.43 | 1.53 | 2.61 | | DNR |
| 130-20 | | 13.03 (Silica Fume) | 6.63 | 3.39 | 1.52 | 2.61 | 5.19 | 9 |
| 130-21 | | 13.52 (Ecoflat) | 6.85 | 3.38 | 1.51 | 2.52 | 2.46 | 3.75 |
| 130-23 | | 24.86 (Silica Fume) | 13.74 | 6.68 | 3.03 | 5.23 | 5.3 | 6.25 |
| 182-15 | | 87.02 g N-clear | 10.98 | 8.03 | 2.99 | 1.96 | | 4.5 |
| 189-2 | | 27.02 PM Floss K | 10.97 | 8.02 | 2.99 | 2 | 1.24 | 2.75 |
| 189-3 | | 450.14g slurry FIK Scrubber Fines* | 6.45 | 4.63 | 1.74 | 1.67 | 0.77 | 1.5 |
| 189-4 | | 12.85 g PM Flk, 14.15 g Flk | 10.97 | 8.03 | 2.99 | 1.98 | 4.06 | DNR |
| 189-5 | | 400.94 g slurry FIK Scrubber Fines | 5.76 | 4.11 | 1.58 | 1.03 | 8.37 | 6 |
| 189-6 | | 20.04 Flk + 5.00 Kiln Feed | 13.69 | 6.67 | 3.05 | 5.19 | 4.07 | 6 |

*Magnesium Carbonate Hydroxide Hydrate (C4Mg4012.H2Mg0.x H20
DNR: Did not record
ND = Not determined, due to low viscosity

TABLE C-2

Process conditions of studying the use of silica sources

| RxN Code | pH pre-rxn | T (° C.) | Pressure (psi) | Yield stress (Pa) | Swelling? | Comments |
|---|---|---|---|---|---|---|
| 130-19 | DNR | 248 | 480 | 175 | y | Swelling is 45 mL, reacted for 3 hr 15 min |
| 130-20 | 9.32 | 248 | 480 | — | n | |
| 130-21 | 9.47 | 245 | 480 | 196 | y | |
| 130-23 | 9.63 | 247 | 500 | 140 | y | Soaked NaOH in Silica Fume in 150 mL DI water for 16 hours |
| 182-15 | 9.6 | 250 | 480 | ND | n | |
| 189-2 | 9.56 | 249 | 500 | ND | n | |
| 189-3 | 9.57 | 250 | 560 | ND | n | |
| 189-4 | DNR | 250 | 500 | ND | n | Cake is green stir for 16 hours, did not swell |
| 189-5 | 9.4 | 251 | 500 | ND | n | |
| 189-6 | 9.6 | 250 | 520 | 362 | y | Works well with elevated amounts of lithium |

DNR: Did not record
ND = Not determined, due to low viscosity

TABLE D-1

Record of other silica and magnesium sources

| RxN Code | N-Clear (g) | BriteSorb D300 (g) | Tailings 2 | Calcined Tailings 2 | NaF (g) | LiOH · H$_2$O (g) | H$_2$SO$_4$ conc, 96% (mL) |
|---|---|---|---|---|---|---|---|
| 130-1 | 21.31 | 10.97 g (PM enstatite) | 4.5 | 0 | 1.5 | 2.49 | 3.25 |
| 130-3 | 21.36 | 9.30 (PM perlite) | 13.63 | 0 | 1.49 | 2.53 | 3 |
| 16-2 | 43.63 | 12.5 | 17.55 | 8.46 | 3.44 | 5.11 | 5.5 |
| 16-3 | 43.83 | 12.49 | 17.55 | 8.49 | 3.05 | 2.57 | 6 |
| 16-4 | 43.45 | 12.41 | 21.83 | 10.6 | 2.98 | 2.02 | 6 |

TABLE D-2

Process conditions studying the use of other silica and magnesium sources

| RxN Code | N-Clear (g) | BriteSorb D300 (g) | RxN Code | pH pre-rxn | T (° C.) | Pressure (psi) | Yield stress (Pa) | Swelling? | Comments |
|---|---|---|---|---|---|---|---|---|---|
| 130-1 | 21.31 g | 10.97 (PM enstatite) | 130-1 | 9.35 | 247 | 480 | 20 | y | |
| 130-3 | 21.36 | 9.30 (PM perlite) | 130-3 | 9.75 | 249 | 530 | | n | |
| 16-2 | 43.63 | 12.5 | 16-2 | 10.07 | 250 | 500 | None | n | Order of addition same as from synthetic sources |
| 16-3 | 43.83 | 12.49 | 16-3 | 9.71 | 250 | 500 | Minimal | ND | Acid added to only Tailings before addition to main slurry. |
| 16-4 | 43.45 | 12.41 | 16-4 | 9.84 | 251 | 500 | Minimal | ND | Acid added to only Tailings before addition to main slurry. |

TABLE E-1

Records of reactions noting the effects of using different acids

| RxN Code | N-Clear (g) | BriteSorb D300 (g) | $MgCO_3$ | MgO (g) | NaF (g) | $LiOH \cdot H_2O$ (g) | $H_2SO_4$ conc, 96% (mL) |
|---|---|---|---|---|---|---|---|
| 148-1 | 43.61 | 12.39 | 13.71 | 6.71 | 2.98 | 5.21 | 12.5 (acetic acid) |
| 148-2 | 44.09 | 12.29 | 13.71 | 6.74 | 2.99 | 5.28 | 7.25 (phosphoric acid) |
| 130-18 | 43.51 | 12.4 | 13.72 | 6.67 | 3.09 | 5.44 | 6 |

TABLE E-2

Process conditions of studying the effects of acidification

| RxN Code | pH pre-rxn | T (° C.) | Pressure (psi) | Yield stress (Pa) | Swelling? | Comments |
|---|---|---|---|---|---|---|
| 148-1 | 9.41 | 245 | 460 | 248 | y | |
| 148-2 | 9.49 | 247 | 460 | 72 | y | XRF indicates uptake of phosphorus |
| 130-18 | 9.49 | 247 | 480 | 308 | y | |

TABLE F-1

Records of selected reactions with different reaction times.

| RxN Code | N-Clear (g) | Syloid 235 (g) | MgO (g) | NaF (g) | $LiOH \cdot H_2O$ (g) | $H_2SO_4$ conc, 96% (mL) |
|---|---|---|---|---|---|---|
| 99-2 | 43.81 | 12.43 | 12.62 | 0 | 5.27 | 6.75 |
| 99-1 | 43.63 | 12.59 | 12.46 | 0 | 5.81 | 7 |
| 70-2 | 43.55 | 12.52 | 12.45 | 0 | 5.55 | 6 |
| 75-6 | 43.77 | 12.69 | 12.43 | 0 | 5.24 | 7 |

TABLE F-2

Process conditions of selected reactions with different reaction times

| RxN Code | N-Clear (g) | Syloid 235 (g) | RxN Code | pH pre-rxn | T (° C.) | Pressure (psi) | Reaction Time (hours) | Yield stress (Pa) | Swelling? |
|---|---|---|---|---|---|---|---|---|---|
| 99-2 | 43.81 | 12.43 | 99-2 | 9.39 | 245 | 440 | 1 | ND | 10 mL-n |
| 99-1 | 43.63 | 12.59 | 99-1 | 9.26 | 244 | 430 | 2 | 160 | 40 mL-y |
| 70-2 | 43.55 | 12.52 | 70-2 | 9.35 | 240 | 450 | 4 | ND | 35 mL-y |
| 75-6 | 43.77 | 12.69 | 75-6 | 9.5 | 239 | 450 | 16 | ND | 42 mL-y |

What is claimed is:

1. A method of making a synthetic hectorite mineral, the method comprising:
mixing sodium silicate, a silica source, lithium hydroxide, sodium fluoride, and water to form a first mixture;
mixing a magnesium source and an acid with the first mixture to form a second mixture, wherein the magnesium source comprises magnesium carbonate and/or magnesium oxide;
heating the second mixture to form an intermediary product; and
drying and milling the intermediary product to form the synthetic hectorite mineral.

2. The method of claim 1, wherein the silica source comprises silica gel having a BET surface area in a range of 400-550 $m^2/g$.

3. The method of claim 1, wherein the silica source comprises a diatomaceous earth product.

4. The method of claim 1, wherein the silica source consists of silica gel, and wherein a mass ratio of the sodium silicate to silica gel is in a range of 1.0:1.2-1.2:1.0.

5. The method of claim 1, wherein the second mixture is heated at a temperature of 200-500° C. and a pressure of 100-800 psi for 0.5-12 hours to form the intermediary product.

6. The method of claim 5, wherein a mass ratio of magnesium carbonate to magnesium oxide is in a range of 1.0:1.2-1.2:1.0.

7. The method of claim 1, wherein the second mixture is agitated during the heating.

8. The method of claim 1, wherein the synthetic hectorite mineral is a 2:1 layered phyllosilicate having a tetrahedral double layer sandwiching an octahedral layer, the octahedral layer having a plurality of octahedral sites occupied by $Mg^{2+}$ or $Li^+$,
wherein the synthetic hectorite mineral has a formula of $Na_a(Mg_bLi_c)(Si_4O_{10})(F_d(OH)_e)$, wherein a is in a range of 0.3 to 0.4;
wherein b and c range from 0 to 3, and b+c=3, and
wherein d and e range from 0 to 2, and d+e=2.

9. The method of claim 8, wherein a ratio of b to c ranges from 7.0:1 to 9.0:1.

10. The method of claim 9, wherein a ratio of b to c ranges from 7.5:1 to 8.5:1.

11. The method of claim 8, wherein at least 90% of the octahedral sites are occupied by $Mg^{2+}$ or $Li^+$, relative to a total number of the octahedral sites.

12. The method of claim 8, wherein d is in a range of 0.3 to 0.7.

13. The method of claim 8, wherein the synthetic hectorite mineral has a D50 in a range of 8-30 μm.

14. The method of claim 8, wherein the synthetic hectorite mineral has a mean crystallite size in a range of 18-38 nm.

15. The method of claim 8, wherein the synthetic hectorite mineral is in the form of platelets having an aspect ratio in a range of 1.2:1 to 3.0:1.

16. The method of claim 8, wherein the synthetic hectorite mineral has a swell index of at least 55 mL, the swell index according to ASTM D5890.

17. The method of claim 8, wherein a suspension comprising 5 wt % of the synthetic hectorite mineral in water, relative to a total weight of the suspension, has a yield point of at least 290 Pa.

18. The method of claim 8, wherein a suspension comprising 5 wt % of the synthetic hectorite mineral in water, relative to a total weight of the suspension, has a yield stress in a range of 350-450 Pa at a temperature of 50-85° C.

19. The method of claim 8, wherein a suspension comprising 2 wt % of the synthetic hectorite mineral in water, relative to a total weight of the water, has a cation exchange capacity in a range of 95-130 meq per 100 g synthetic hectorite mineral.

* * * * *